US012761673B2

(12) United States Patent
Mirvakili et al.

(10) Patent No.: US 12,761,673 B2
(45) Date of Patent: Oct. 13, 2026

(54) SYSTEMS AND METHODS FOR SUPPLYING POWER AND HIGH PRECISION VOLTAGE MEASUREMENT

(71) Applicant: Seron Electronics Ltd., Vancouver (CA)

(72) Inventors: Seyed Mohammad Mirvakili, Vancouver (CA); Douglas Hak Hian Sim, Vancouver (CA)

(73) Assignee: Seron Electronics Ltd., Vancouver (CA)

( * ) Notice: Subject to any disclaimer, the term of this patent is extended or adjusted under 35 U.S.C. 154(b) by 277 days.

(21) Appl. No.: 18/442,053

(22) Filed: Feb. 14, 2024

(65) Prior Publication Data

US 2024/0250611 A1 Jul. 25, 2024

Related U.S. Application Data

(63) Continuation of application No. PCT/CA2022/051706, filed on Nov. 18, 2022.

(60) Provisional application No. 63/367,116, filed on Jun. 27, 2022, provisional application No. 63/264,348, filed on Nov. 19, 2021.

(51) Int. Cl.

| | |
|---|---|
| ***G05F 1/46*** | (2006.01) |
| ***G05F 1/59*** | (2006.01) |
| ***H02M 1/00*** | (2007.01) |
| ***H02M 7/04*** | (2006.01) |

(52) U.S. Cl.

CPC .............. *G05F 1/461* (2013.01); *G05F 1/462* (2013.01); *G05F 1/59* (2013.01); *H02M 1/0009* (2021.05); *H02M 1/0045* (2021.05); *H02M 7/04* (2013.01)

(58) Field of Classification Search

CPC ............ G05F 1/461; G05F 1/462; G05F 1/59; H02M 1/0009; H02M 1/0045; H02M 7/04

See application file for complete search history.

(56) References Cited

U.S. PATENT DOCUMENTS 7,098,622 B2 8/2006 Vulovic
9,444,323 B2 9/2016 Proca
(Continued)

FOREIGN PATENT DOCUMENTS

EP 1120904 B1 3/2012
EP 3675339 A1 7/2020
(Continued)

*Primary Examiner* — Jue Zhang
(74) *Attorney, Agent, or Firm* — Seed Intellectual Property Law Group LLP

(57) ABSTRACT

An example power supply system includes: a loading circuit including power electronics configured to apply DC electrical power to a load; a power supply unit coupled to drive the loading circuit; and a controller. The controller may be configured to at least: generate a voltage control signal and a current control signal to be received as input by the loading circuit, the voltage control signal and current control signal representing voltage and current values to be applied to the load; determine a voltage level to be supplied by the power supply unit to the loading circuit; and provide a power supply voltage control signal to the power supply unit representing the voltage level to be supplied by the power supply unit to the loading circuit. The power supply system may include a circuit for measuring voltage with high precision.

19 Claims, 17 Drawing Sheets

(56) References Cited

U.S. PATENT DOCUMENTS

| | | | |
|---|---|---|---|
| 9,692,299 | B2 | 6/2017 | Kitagaki |
| 10,591,940 | B2 | 3/2020 | Kyakuno |
| 10,872,753 | B2 | 12/2020 | Deford |
| 11,171,558 | B2 | 11/2021 | Weigell et al. |
| 11,239,688 | B2 | 2/2022 | Weigell et al. |
| 11,557,974 | B2 | 1/2023 | Deford |
| 2003/0111908 | A1 | 6/2003 | Christensen |
| 2012/0007512 | A1 | 1/2012 | Kim et al. |
| 2013/0336031 | A1 | 12/2013 | McCune, Jr. |
| 2014/0132184 | A1 | 5/2014 | Gaknoki et al. |
| 2019/0245457 | A1 | 8/2019 | Telefus et al. |
| 2020/0266706 | A1* | 8/2020 | Schwabe .................. G06F 1/26 |
| 2021/0265907 | A1* | 8/2021 | Malone ............ H02M 3/33573 |
| 2022/0294341 | A1 | 9/2022 | Abe et al. |
| 2022/0350352 | A1 | 11/2022 | Weeman |

FOREIGN PATENT DOCUMENTS

| | | | |
|---|---|---|---|
| EP | 4178059 | A1 | 5/2023 |
| JP | 5601030 | B2 | 10/2014 |
| JP | 6007127 | B2 | 10/2016 |

* cited by examiner

SYSTEMS AND METHODS FOR SUPPLYING POWER AND HIGH PRECISION VOLTAGE MEASUREMENT

CROSS-REFERENCE TO RELATED APPLICATIONS

This application is a continuation of Patent Cooperation Treaty (PCT) application No. PCT/CA2022/051706 having an international filing date of 18 Nov. 2022 which in turn claims priority from, and for the purposes of the United States of America the benefit under 35 USC § 119 in connection with, U.S. application No. 63/264,348 filed 19 Nov. 2021 and U.S. application No. 63/367,116 filed 27 Jun. 2022. All of the applications referred to in this paragraph are hereby incorporated herein by reference.

FIELD

The present disclosure relates to electrical power supply systems and methods and voltage measurement systems and methods. Some embodiments provide multi-mode DC power supply systems and methods. Some embodiments provide high precision analog voltage measurement systems and methods.

BACKGROUND

DC power supply systems are operable to provide DC electrical power to various loads. Such power supply systems may be lab bench top systems (e.g. suitable for use in laboratory settings) or as part of a device to provide electrical power to one or more loads in the device. Some DC power supply systems have controls to set a desired DC voltage that is to be applied to the load and a current limiter. The power supply system maintains the DC voltage except as necessary to prevent the current from exceeding a current limit set by the current limiter when a load is connected to the power supply system.

Analog-to-digital converters (ADCs) are operable to convert analog signals into digital values. However, many ADCs typically have an effective number of bits (ENOB) which is less than their actual number of bits. This is because there is a tradeoff between achieving a high ENOB and achieving a high sampling rate. Everything else being equal, an ADC designed to provide a full ENOB (i.e. the ENOB is equal to the actual number of bits of an ADC) will have a sampling rate that is lower than a similar ADC designed to provide a lower ENOB. This discrepancy arises because achieving a higher ENOB generally requires a longer conversion time and/or averaging over a larger number of output samples. For example, achieving a full ENOB may reduce the output sampling rate to about 0.2 samples per second (SPS) for some ADCs.

There is a need for improved power supply systems and methods. Additionally, or alternatively, there is a need for improved voltage measurement systems and methods.

SUMMARY

This invention has a number of aspects. These include, without limitation:

- power supply systems;
- systems and methods for providing constant power;
- systems and methods for measuring electrical characteristics of a device;
- systems and methods for driving power electronics;
- systems and methods for controlling an electrical device;
- systems and methods for measuring analog voltages with high precision;
- systems and methods for measuring offset and/or drift voltages of at least one electrical component;
- systems and methods for reducing noise.

The above aspects may be used independently of one another. Additionally, or alternatively, two or more of the above aspects may be used together.

Although the technology described herein is described using an example application in a power supply system that is connected to deliver electrical power to a load, in some embodiments the technology is applied to control operation of other electrical devices. The term "power supply system" is not limited to systems that are used solely to deliver electrical power to loads. In some embodiments the technology described herein is adapted to control electrical devices. In some such embodiments the technology described herein provides a user configurable platform for controlling electrical devices. For example, by controlling how much power is supplied to an electrical device the technology described herein can control one or more parameters of the electrical device such as its operating temperature, emitted light intensity, etc. Such control of the electrical device advantageously may be performed in an open loop configuration without requiring additional feedback sensors (e.g. temperature sensors, light intensity sensors, etc.).

One aspect of the invention provides a power supply system. The power supply system may comprise a loading circuit comprising power electronics configured to apply DC electrical power to a load. The power supply system may also comprise a power supply unit coupled to drive the loading circuit. The power supply unit may comprise a converter configured to convert input AC electrical power to DC electrical power. The power supply system may also comprise a controller. The controller may be configured to generate a voltage control signal and a current control signal to be received as input by the loading circuit. The voltage control signal and current control signal may represent voltage and current values respectively to be applied to the load. The controller may also be configured to determine a voltage level to be supplied by the power supply unit to the loading circuit. The controller may also be configured to provide a power supply voltage control signal to the power supply unit. The power supply voltage control signal may represent the voltage level to be supplied by the power supply unit to the loading circuit.

In some embodiments the voltage level to be supplied by the power supply unit to the loading circuit is greater than the voltage to be applied across the load by a minimum threshold amount. In some embodiments the minimum threshold amount is at least 0.8V.

In some embodiments the power supply system comprises one or both of a voltage sensor configured to measure a voltage drop across the load and a current sensor configured to measure current passing through the load. The voltage control signal and the current control signal may at least partially be based on the measured voltage and/or current.

In some embodiments the power electronics comprise a plurality of amplifiers. The plurality of amplifiers may comprise at least a first amplifier and a second amplifier. The second amplifier may have a greater maximum output current than the first amplifier.

In some embodiments the power supply system comprises a first relay operable to couple an output of the first amplifier to the load and a second relay operable to couple an output of the second amplifier to the load. The controller may be configured to activate one or both of the first relay and the second relay based on a maximum current that is to pass through the load. The maximum current may be less than the maximum output current of the amplifier corresponding to the activated relay.

In some embodiments the voltage control signals and current control signals are determined at least in part based on open loop control of a performance parameter of the load.

In some embodiments the performance parameter of the load comprises one of temperature, light intensity, strain and stress.

In some embodiments the load comprises a dynamically varying load.

In some embodiments the power supply system comprises a trained machine learning model. The machine learning model may be trained to optimize the voltage control signal and/or the current control signal based in part on power dissipation characteristics of the load.

In some embodiments the trained machine learning model comprises a neural network.

In some embodiments the loading circuit is configurable to apply power in the range from about 1 μW to about 1 MW.

In some embodiments the loading circuit has an output voltage controllable in the range of 0V to about 36V.

In some embodiments the loading circuit has an output current controllable in the range of 0 A to about 16 A.

In some embodiments the controller is configurable to control the loading circuit to provide constant power, constant current and/or constant voltage.

In some embodiments the power supply system comprises a circuit for measuring analog voltages. The circuit for measuring analog voltages may comprise at least a first analog-to-digital converter. The first analog-to-digital converter may be configured to receive an input analog voltage signal. The circuit for measuring analog voltages may also comprise a baseline reference circuit. The baseline reference circuit may be configured to generate a baseline voltage. The baseline reference circuit may be configurable by the controller. The circuit for measuring analog voltages may also comprise a difference circuit. The difference circuit may be configured to subtract the baseline voltage from the input analog voltage signal.

In some embodiments to configure the baseline reference circuit the controller is configured to divide the input analog voltage by a step size of the first analog-to-digital converter, round the result of the division down to a nearest integer value and multiply the nearest integer value by the step size of the first analog-to-digital converter.

In some embodiments the baseline reference circuit comprises a programmable voltage source.

In some embodiments the baseline reference circuit receives as input a bias voltage signal. The bias voltage signal may be combinable with the baseline voltage to mitigate an offset voltage or bias voltage introduced by one or more components of the baseline reference circuit.

In some embodiments one or both of the baseline reference circuit and the controller are configured to compensate for voltage drifts of one or more components of the baseline reference circuit.

In some embodiments the voltage drifts are caused by a change of temperature of the one or more components of the baseline reference circuit.

In some embodiments the baseline reference circuit comprises an analog circuit configured to compensate for the voltage drifts.

In some embodiments the baseline reference circuit comprises one or more filters configured to at least partially suppress noise or other artifacts from the baseline voltage.

In some embodiments the difference circuit is configured to amplify a difference between the input analog voltage signal and the baseline voltage.

In some embodiments the difference circuit comprises a differential amplifier.

In some embodiments the circuit for measuring analog voltages comprises a second analog-to-digital converter configured to receive an analog output from the difference circuit and to convert the analog output into corresponding digital values. The controller may be configured to receive the digital values from the second analog-to-digital converter.

In some embodiments the controller is configured to divide the received digital values from the second analog-to-digital converter by a gain of the difference circuit to determine a value of a least significant bit and replace the values of a least significant bit of the input analog voltage signal with the determined value of the least significant bit.

In some embodiments the first and second analog-to-digital converters are operated concurrently.

In some embodiments the first and second analog-to-digital converters each comprise a delta-sigma (ΔΣ) analog-to-digital converter.

In some embodiments the first analog-to-digital converter is configured to receive an analog output from the difference circuit and to convert the analog output into corresponding digital values and wherein the controller is configured to receive the digital values from the first analog-to-digital converter.

In some embodiments the power supply system comprises a multiplexer controllable to select whether the first analog-to-digital converter receives as input the input analog voltage signal or the analog output from the difference circuit.

In some embodiments the controller is configured to verify whether one or both of the baseline reference circuit and the difference circuit are properly configured.

In some embodiments the power supply system comprises a different power source for at least one analog component than a power source for at least one digital component.

Another aspect of the invention provides a method for controlling a parameter of a load. The method may comprise determining a relationship between the parameter of the load and power dissipated by the load. The method may also comprise delivering electrical power to the load and based on the determined relationship controlling the power applied to the load to maintain the parameter of the load within a desired range.

In some embodiments determining the relationship between the parameter of the load and power dissipated by the load comprises applying a time varying calibration signal to the load and measuring a change in the parameter as the calibration signal is applied.

In some embodiments the calibration signal comprises a time varying voltage signal.

In some embodiments the calibration signal comprises a voltage ramp signal.

In some embodiments power is applied to the load with a power supply system having any feature or combination of features described herein.

Another aspect of the invention provides a system for measuring analog voltages. The system may comprise a controller. The system may also comprise at least a first analog-to-digital converter. The first analog-to-digital converter may be configured to receive an input analog voltage signal. The system may also comprise a baseline reference circuit. The baseline reference circuit may be configured to generate a baseline voltage. The baseline reference circuit may be configurable by the controller. The system may also comprise a difference circuit. The difference circuit may be configured to subtract the baseline voltage from the input analog voltage signal.

In some embodiments to configure the baseline reference circuit the controller is configured to divide the input analog voltage by a step size of the first analog-to-digital converter, round the result of the division down to a nearest integer value and multiply the nearest integer value by the step size of the first analog-to-digital converter.

In some embodiments the baseline reference circuit comprises a programmable voltage source.

In some embodiments the baseline reference circuit receives as input a bias voltage signal. The bias voltage signal may be combinable with the baseline voltage to mitigate an offset voltage or bias voltage introduced by one or more components of the baseline reference circuit.

In some embodiments one or both of the baseline reference circuit and the controller are configured to compensate for voltage drifts of one or more components of the baseline reference circuit.

In some embodiments the voltage drifts are caused by a change of temperature of the one or more components of the baseline reference circuit.

In some embodiments the baseline reference circuit comprises an analog circuit configured to compensate for the voltage drifts.

In some embodiments the baseline reference circuit comprises one or more filters configured to at least partially suppress noise or other artifacts from the baseline voltage.

In some embodiments the difference circuit is configured to amplify a difference between the input analog voltage signal and the baseline voltage.

In some embodiments the difference circuit comprises a differential amplifier.

In some embodiments the system for measuring analog voltages comprises a second analog-to-digital converter configured to receive an analog output from the difference circuit and to convert the analog output into corresponding digital values. The controller may be configured to receive the digital values from the second analog-to-digital converter.

In some embodiments the controller is configured to divide the received digital values from the second analog-to-digital converter by a gain of the difference circuit to determine a value of a least significant bit and replace the values of a least significant bit of the input analog voltage signal with the determined value of the least significant bit.

In some embodiments the first and second analog-to-digital converters are operated concurrently.

In some embodiments the first and second analog-to-digital converters each comprise a delta-sigma (ΔΣ) analog-to-digital converter.

In some embodiments the first analog-to-digital converter is configured to receive an analog output from the difference circuit and to convert the analog output into corresponding digital values. The controller may be configured to receive the digital values from the first analog-to-digital converter.

In some embodiments the system for measuring analog voltages comprises a multiplexer controllable to select whether the first analog-to-digital converter receives as input the input analog voltage signal or the analog output from the difference circuit.

In some embodiments the controller is configured to verify whether one or both of the baseline reference circuit and the difference circuit are properly configured.

In some embodiments the system for measuring analog voltages comprises a different power source for at least one analog component than a power source for at least one digital component.

Further aspects and example embodiments are illustrated in the accompanying drawings and/or described in the following description.

It is emphasized that the invention relates to all combinations of the above features, even if these are recited in different claims.

BRIEF DESCRIPTION OF THE DRAWINGS

The accompanying drawings illustrate non-limiting example embodiments of the invention.

DETAILED DESCRIPTION

Throughout the following description, specific details are set forth in order to provide a more thorough understanding of the invention. However, the invention may be practiced without these particulars. In other instances, well known elements have not been shown or described in detail to avoid unnecessarily obscuring the invention. Accordingly, the specification and drawings are to be regarded in an illustrative, rather than a restrictive sense.

Figure 1:
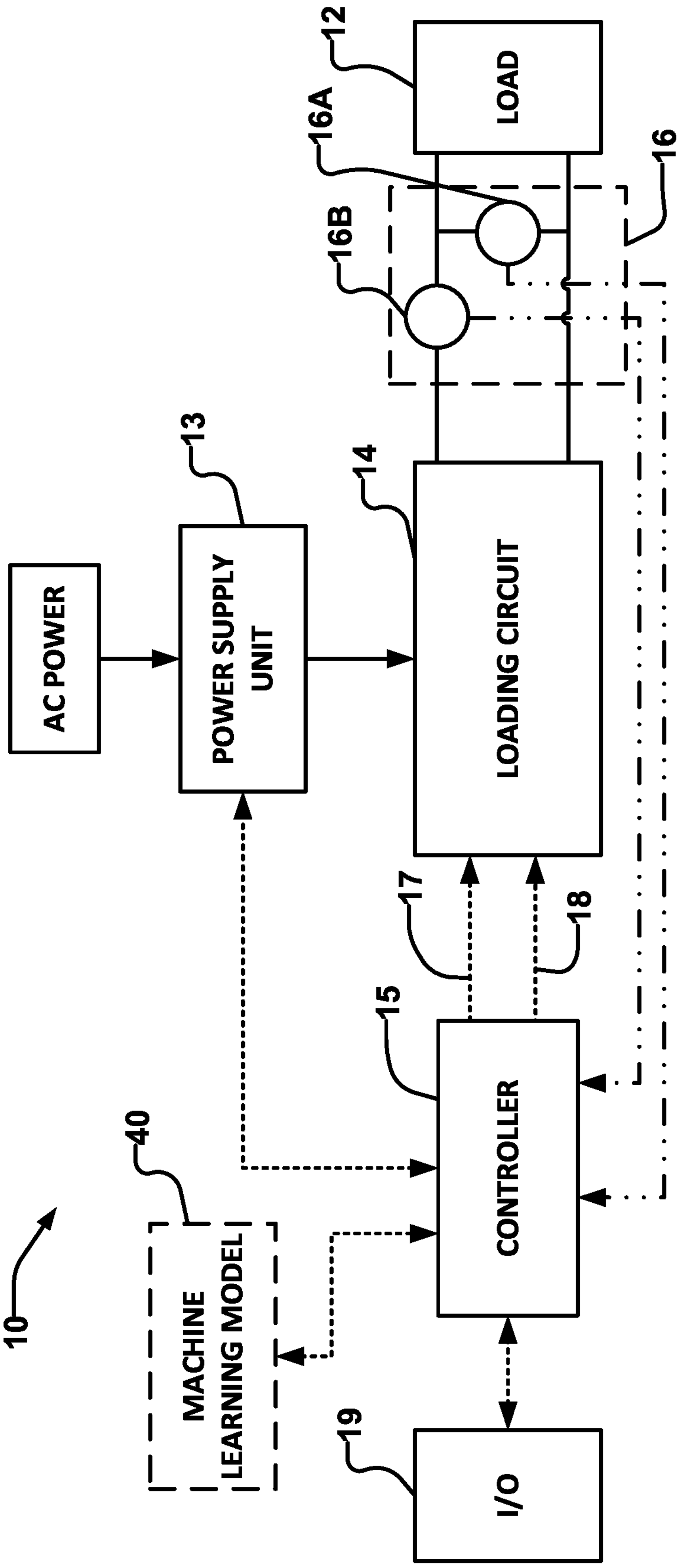
FIG. 1 is a schematic illustration of a power supply system according to an example embodiment of the present technology.

FIG. 1 schematically illustrates an electric power supply system 10 which is operable to supply DC electrical power to a load 12. Power supply system 10 is advantageously operable in different modes. In some cases power supply system 10 is operated in a constant voltage mode (i.e. a constant voltage is applied across load 12). In some cases power supply system 10 is operated in a constant current mode (i.e. a constant current passes through load 12). In some cases power supply system 10 is operated in a constant power mode (i.e. a constant power amount is dissipated by load 12). A mode of operation of power supply system 10 may be selected by a user of power supply system 10 (e.g. by operating one or more controls of the power supply system, sending commands to the power supply system via a suitable interface, etc.).

Power supply system 10 comprises a power supply unit 13 which converts input AC electrical power (e.g. a 110V 60 Hz signal, a 220V 50 Hz signal, etc.) from a source such as an electrical power outlet into DC electrical power. Power supply unit 13 may, for example, comprise a rectifier which is configured to convert AC power to DC power. In some embodiments power supply unit 13 comprises a variable switching power supply. In some embodiments power supply unit 13 comprises a step-down AC to DC converter. For example, the step-down AC to DC converter may receive as input AC voltages of about 110V, 220V, etc. and output DC voltages in a range from about 0V to about 48V. An output of power supply unit 13 is connected to supply power to an analog loading circuit 14 (e.g. the converted DC power drives analog loading circuit 14).

Loading circuit 14 comprises power electronics (e.g. op-amps, bi-polar junction transistors, MOSFETs, etc.) which are configured to drive load 12 with a desired voltage and current. Loading circuit 14 receives from controller 15 control signals (e.g. voltage signal 17, current signal 18, etc.) which control the output of loading circuit 14 to drive load 12. In some embodiments the control signals represent the desired voltage and current values to be provided to load 12. In some embodiments the control signals are analog signals. The control signals, for example, may be amplified by the power electronics of loading circuit 14 to generate an output signal that is applied to load 12.

In some embodiments loading circuit 14 receives input analog signals directly from controller 15. In some embodiments controller 15 outputs digital values representing the desired voltage and current values to be provided to load 12. The digital values may pass through digital to analog converters before being input into loading circuit 14. In some embodiments the digital to analog converters comprise 18-bit digital to analog converters. In some embodiments the digital to analog converters have a resolution in the range from about 0.01 mV to 0.5V. In some embodiments at least one of the digital to analog converters has a resolution of about 0.01 mV.

In some embodiments loading circuit 14 comprises amplifiers. A plurality of the amplifiers may be configured as a cascaded voltage-follower. For the purposes described herein "cascaded voltage-follower" means that an output of a first voltage-follower is provided as input to a second voltage-follower and additional voltage-followers may be added as such to increase a maximum current amount that can be provided (e.g. to a load). In some embodiments each of the voltage-followers comprises a unity gain voltage-follower. Such cascaded voltage-follower design increases the current capacity each time an additional voltage-follower is added. For example, adding a second voltage-follower amplifier may double the current capacity compared to the circuit in which only one voltage-follower amplifier is used. Power supplies of the type described herein may be constructed to have a desired maximum current output by providing a number of voltage-follower amplifiers which each have a sufficient maximum output current rating such that the amplifier(s) are collectively (if more than one amplifier) operable to supply up to the desired maximum current output.

Having a loading circuit 14 which is analog as opposed to a digital pulse-width modulation circuit, a voltage-controlled oscillator (VCO) circuit or the like may advantageously:

- prevent or reduce back EMF for inductive loads;
- place less stress on circuit elements of power supply system 10;
- generate a reduced amount of parasitic electromagnetic noise;
- reduce voltage spikes;
- increase output dynamic range;
- improve output control at small voltages (e.g. voltages less than 1.5V);
- increase resolution;
- reduce output ripple;
- increase accuracy with which small thermal loads (e.g. heating of micro or nano structures, etc.) may be controlled;
- etc.

Controller 15 determines voltage and current values that are to be applied to load 12 based on desired performance parameters (e.g. for load 12 to dissipate a constant set power value; to maintain a constant desired voltage across load 12; for current drawn by load 12 not to exceed a set amount; etc.). Typically the desired performance parameters are set by a user. In some cases the performance parameters may be set autonomously by controller 15 based on known characteristics of load 12.

A plurality of sensors 16 provide feedback to controller 15. As shown in FIG. 1, power supply system 10 may comprise a voltage sensor 16A configured to measure a voltage being applied across load 12 and a current sensor 16B configured to measure a current being drawn by load 12. Based on measurements made by one or more of sensors 16, controller 15 may dynamically vary the voltage and current input signals 17, 18 respectively that are being provided to loading circuit 14. Input signals 17, 18 (e.g. control signals) may be varied based on the provided feedback for load 12 to, for example, dissipate a desired power amount, draw a constant current, have a constant voltage drop, etc.

Although sensors 16 have been illustrated as separate components, one or more of sensors 16 may be part of controller 15. For example, controller 15 may comprise one or more internal analog-to-digital converters (ADCs) which can receive analog voltage signals and therefore a voltage across load 12 may be measured using such internal ADCs. In some embodiments one or more sensors 16 continuously measure the value(s) they are configured to measure. In some embodiments voltage sensor 16A continuously measures voltage. In some embodiments current sensor 16B continuously measures current. In some embodiments voltage sensor 16A comprises voltage measurement circuit 50 described elsewhere herein.

A user may interact with power supply system 10 via input/output ("I/O") unit 19. I/O unit 19 may, for example, comprise one or more input devices (e.g. touch screens, buttons, keyboards, pointer devices, etc.), one or more output devices (e.g. displays, light indicators, USB output devices, etc.), one or more network connections (e.g. internet connections, connections to other computing devices, connections to cloud servers, etc.). Parameters such as a voltage value, current value, power value, mode of operation (e.g. constant power, constant voltage, constant current, constant electric charge, constant resistance and/or load, etc.) may be set by a user via I/O unit 19.

Power supply unit 13 provides input power to the power electronics of loading circuit 14 (e.g. an output of power supply unit 13 is connected to an input power node (e.g. VCC input) of loading circuit 14). If the voltage provided by power supply unit 13 is higher than an output voltage value to be provided by loading circuit 14 (i.e. the voltage applied to load 12) then loading circuit 14 may reduce the voltage but power will be dissipated (e.g. through heat) by the component (or components) of loading circuit 14 across which the voltage is dropped thereby reducing an overall efficiency of power supply system 10. For the power electronics of loading circuit 14 to function properly it may be necessary or desirable that the voltage supplied at the input power node (e.g. VCC) exceeds the desired output voltage of loading circuit 14 by a given amount. For example, the input power node voltage (e.g. VCC) may be at least 0.5V, 1.0V, 1.5V, etc. higher than the output voltage value. To improve efficiency, controller 15 may configure power supply unit 13 to provide as the input power voltage (e.g. VCC voltage) a voltage that is the required threshold higher (or a set amount higher (e.g. 10% more than the threshold value, 15% more than the threshold value, 20% more than the threshold value, etc.)) than the currently desired output voltage value of loading circuit 14. Advantageously the input power node voltage (e.g. VCC) may be set in an open loop scheme based on the desired output voltage value without requiring feedback. In some embodiments the input power node voltage (e.g. VCC) is dynamically varied.

In some embodiments a negative input power node of loading circuit 14 (e.g. VSS) is grounded. In some embodiments power supply unit 13 supplies to the negative input power node (e.g. VSS) of loading circuit 14 a negative voltage having the same magnitude as the positive voltage applied to the positive input power node (e.g. VCC) of loading circuit 14. In some embodiments a negative voltage may be supplied to the negative input power node (e.g. VSS) if the output voltage of loading circuit 14 is less than 1V.

The voltage supplied to the negative input power node (e.g. VSS) may be varied in response to the present output voltage of loading circuit 14. For example, the voltage supplied to the negative input power node (e.g. VSS) may be set to be more negative than a current output voltage of loading circuit 14 or more negative than the most negative limit of a current output voltage of loading circuit 14 by at least the required threshold amount (i.e. an inherent set amount by which the voltage supplied to the negative input power node must be more negative than the desired output voltage of loading circuit 14 for the electronics to function properly). In some embodiments the voltage supplied to the negative input power node (e.g. VSS) is dynamically varied in response to changes in the current output voltage or output voltage range of loading circuit 14. For example, the voltage supplied to the negative input power node (e.g. VSS) may be more negative than the output voltage of loading circuit 14 by a voltage in the range of about −2V to about −0.8V (e.g. −1V).

In some embodiments controller 15 dynamically varies the voltage that is to be supplied by power supply unit 13 based on the output voltage value of loading circuit 14 and/or voltage and current input signals 17, 18. In some embodiments controller 15 sets the voltage that is to be supplied by power supply unit 13 based on a maximum output voltage value that will be provided by loading circuit 14 for a specific load 12.

In some embodiments controller 15 provides an analog signal to power supply unit 13 to set the voltage that is to be provided by power supply unit 13 (e.g. via a digital to analog converter (for example a 12-bit digital to analog converter)). In some embodiments controller 15 provides a digital signal to power supply unit 13 to set the voltage that is to be provided by power supply unit 13.

Figure 2:
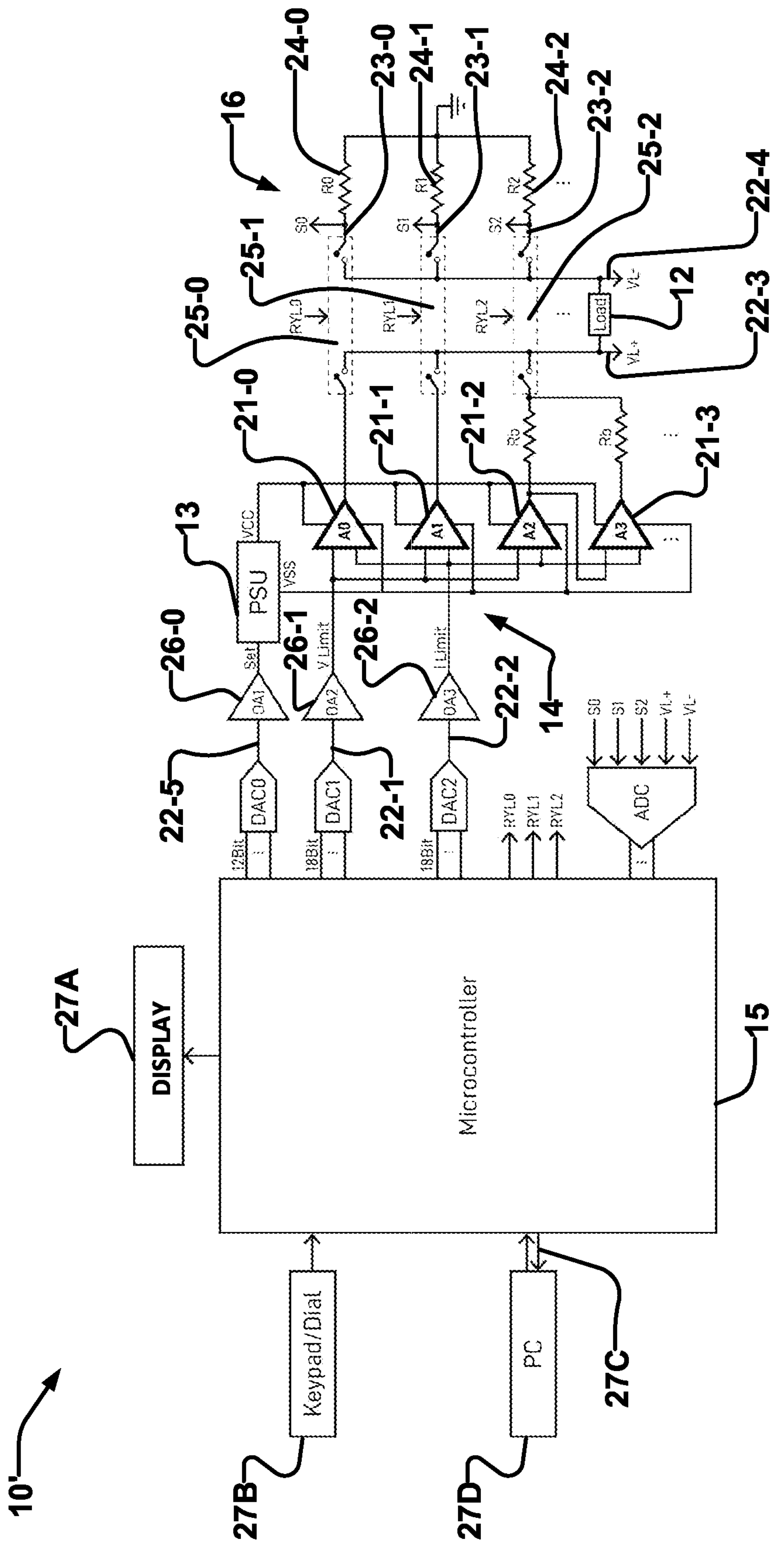
FIG. 2 is an electrical schematic diagram of an example power supply system.

FIG. 2 is an electric schematic diagram illustrating an example embodiment 10' of a power supply system 10.

In the example shown in FIG. 2 loading circuit 14 comprises a plurality of op-amps 21. Op-amps 21 receive, as input, a signal 22-1 corresponding to a voltage that is to be applied to load 12 and a signal 22-2 corresponding to a current that is to be drawn by load 12. Op-amps 21-2 and 21-3 are configured as a cascaded voltage follower. Resistors Rb which couple outputs of amplifiers 21-2 and 21-3 to relay 25-2 prevent racing of the outputs of op-amps 21-2 and 21-3. As described elsewhere herein, additional amplifiers configured as unity gain voltage followers may be cascaded with op-amps 21-2 and 21-3 or existing amplifiers may be removed to vary current capacity of loading circuit 14.

Power supply system 10' also comprises a plurality of sensors 23. Sensors 23 measure current passing through them. The measured current may be a feedback parameter considered by controller 15. Each of the sensors 23 may comprise a corresponding shunt resistor 24 and a voltage measuring device (e.g. analog to digital converter, etc.). A signal (e.g. S0, S1, S2) from each of shunt resistors 24 may be interfaced with the voltage measuring device. The signal corresponds to the voltage at a highside (e.g. V+) of the corresponding shunt resistor 24. The signal may, for example, be interfaced with the voltage measuring device via a serial connection such as an $I^2C$ connection or the like.

Resistors 24 may be the same or different for different sensors 23. Varying resistance of resistors 24 may vary sensitivity and/or resolution of corresponding sensors 23. In some embodiments sensors 23 are biased with resistors 24 having high resistances (e.g. 1Ω, 10Ω, 10Ω, 10 MΩ, etc.) to measure small currents (e.g. less than 100 mA currents). Sensors 23 may be biased with resistors 24 having smaller resistances (e.g. 10 mΩ) to measure larger currents (e.g. 8A). Resistors 24 typically comprise high precision resistors (e.g. having resistance values that vary +/−1% from their nominal values). For smaller current amounts (e.g. less than 100 mA) it may be preferable for resistors 24 to comprise high precision resistors.

In some embodiments voltage across load 12 may be measured by inputting both the positive and negative voltage signals (e.g. signals 22-3 and 22-4) on either side of load 12 directly into analog inputs of controller 15 (e.g. controller 15 comprises internal analog to digital converters). Controller 15 may then internally directly measure a voltage value across load 12. For example, voltage signal 22-4 may be subtracted from voltage signal 22-3 to determine voltage across load 12. In some embodiments a voltage signal on only one side of load 12 is input into controller 15. In some embodiments power supply system 10' comprises a separate voltage sensor (or sensors) connected to measure the voltage that is applied to load 12.

In some embodiments signals 22-3 and 22-4 are input into a chip device which may, for example, be configured to provide voltage measurements. In some embodiments the chip comprises high resolution analog to digital converters (e.g. 16-bit or higher resolution). An output of the chip (e.g.

a measured voltage drop) may be communicated by a suitable data communication technology (e.g. with an $I^2C$ bus, SPI (serial peripheral interface), wirelessly, etc.). The chip device, or another similar chip device, may measure voltage drops across shunt resistors 24 to measure current. In some embodiments voltage is measured with circuit 50 as described elsewhere herein. In some embodiments signals 22-3 and 22-4 are input into circuit 50.

A plurality of relays 25 couple amplifiers 21 and sensors 23 to load 12. By coupling outputs of different numbers of amplifiers 21 to load 12 a maximum current amount that can be applied to load 12 can be increased or decreased accordingly. Power supply system 10 may be designed to have more or fewer amplifiers 21 than are shown in FIG. 2. The number of relays 25 and/or sensors 23 may be varied based on the number of amplifiers 21. Additionally, or alternatively, how relays 25 are configured or connected relative to one another or other components may be varied.

In some embodiments each relay 25 corresponds to a specific current range. Amplifiers 21-0, 21-1, 21-2 may be different amplifiers with different maximum current capacities. Amplifier 21-3 may be the same as amplifier 21-2. By operating relays 25 to couple one of amplifiers 21 (or a set of two or more amplifiers 21 (e.g. amplifiers 21-2 and 21-3)) to load 12, a specific current range to be applied to load 12 may be selected based on which relay(s) 25 and corresponding amplifier(s) 21 are selected.

In some embodiments relays 25 are selected differently based on a mode that power supply system 12 is operating in. For example, if power supply system 10 is operating in a constant voltage mode, relay 25 and amplifier 21 corresponding to a higher current range may be selected to avoid damaging sensors 23 (e.g. by running a current higher than what a specific sensor 23 is rated for). If power supply system 10 is operating in a constant current mode, then a relay 25 (and amplifier 21) corresponding to the set current value is selected. If current exceeds a rated limit for the selected relay 25 (and amplifier 21) then power supply system 10 (e.g. controller 15 or the like) may automatically select a relay 25 (and amplifier(s) 21) with a higher current rating. If power supply system 10 is operating in a constant power mode, then a relay 25 (and amplifier 21) may be selected based on measured current passing through load 12. In some embodiments irrespective of the mode power supply system 10 is operating in, power supply system 10 may dynamically vary which relay 25 (and amplifier 21) is used based on real time measurements of current (e.g. if current is close to rated capacity, select a relay 25 corresponding to a higher current amount; if current is low, select a relay 25 corresponding to a lower current amount; etc.).

In some embodiments each relay 25 couples a corresponding shunt resistor 24 to a voltage measuring device.

In some embodiments at least one sensor 23 is coupled on a high side of load 12 (i.e. connected between amplifiers 21 and VL+ of load 12). In such embodiments the low side of load 12 (i.e. VL−) may be grounded. In some embodiments sensors 23 are coupled on both the high side (VL+) of load 12 and the low side (VL−) of load 12.

In some embodiments power supply system 10 comprises a single sensor 23. Such sensor 23 may comprise a shunt resistor 24 which has variable resistance. The variable resistance may dynamically vary a sensing range of such sensor 23.

Input signals (e.g. voltage signal 22-1, current signal 22-2, PSU signal 22-5, etc.) may be initially amplified by corresponding amplifiers 26. Amplifiers 26 may optionally be configured as unity gain buffers or isolators.

Figure 2A:
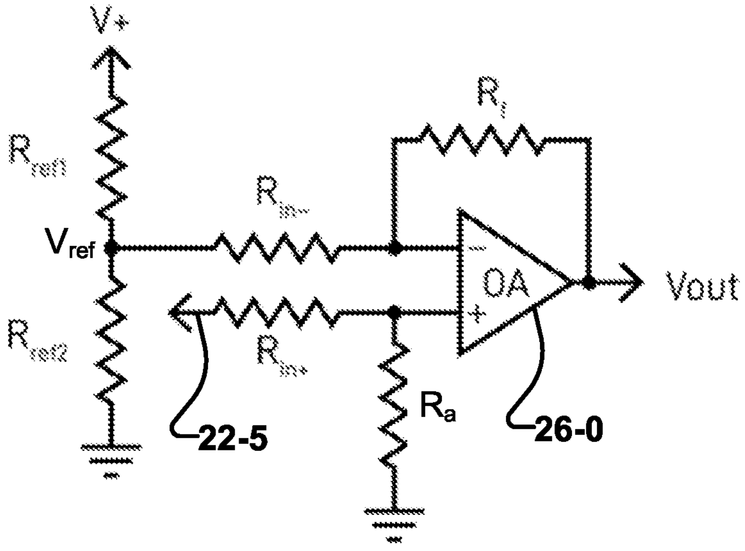
FIG. 2A is an electrical schematic diagram of an example circuit.
Figure 2B:
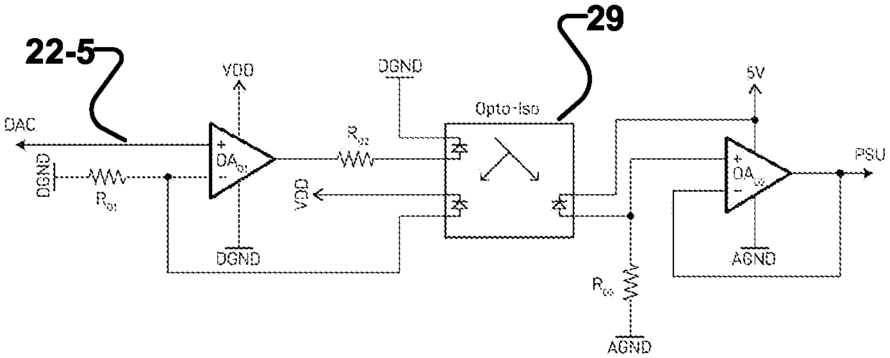
FIG. 2B is an electrical schematic diagram of an example circuit.
Figure 2C:
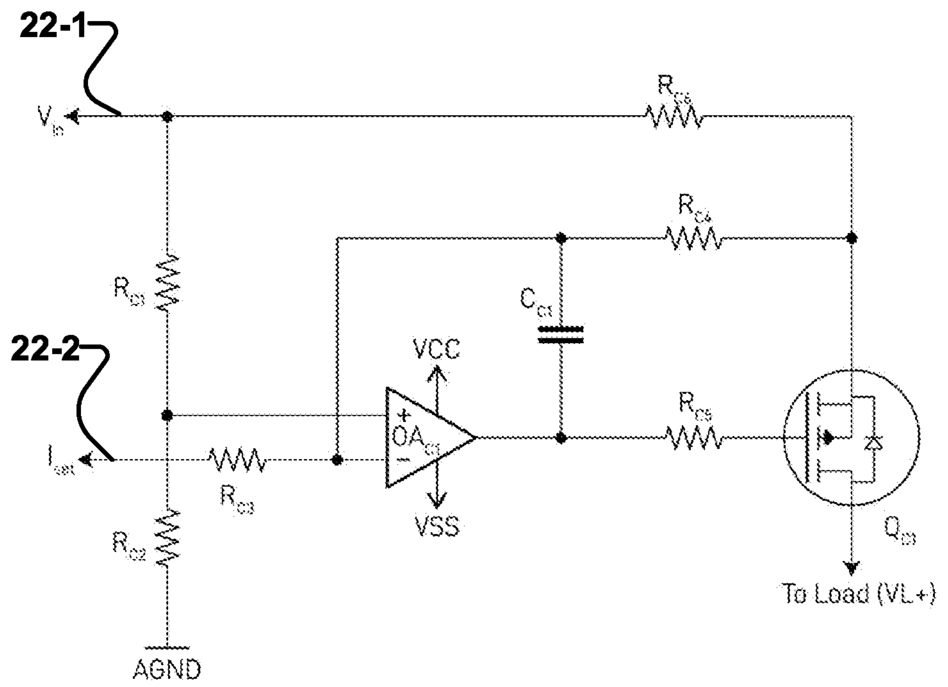
FIG. 2C is an electrical schematic diagram of an example circuit.
Figure 2D:
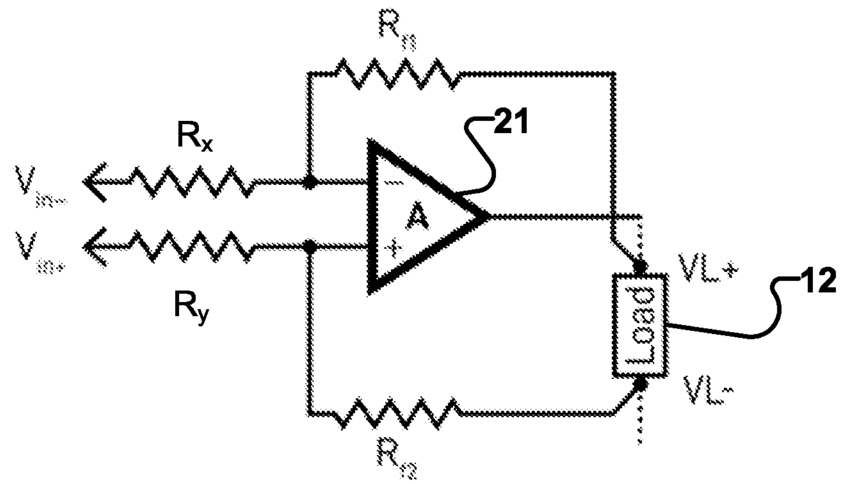
FIG. 2D is an electrical schematic diagram of an example circuit.
Figure 2E:
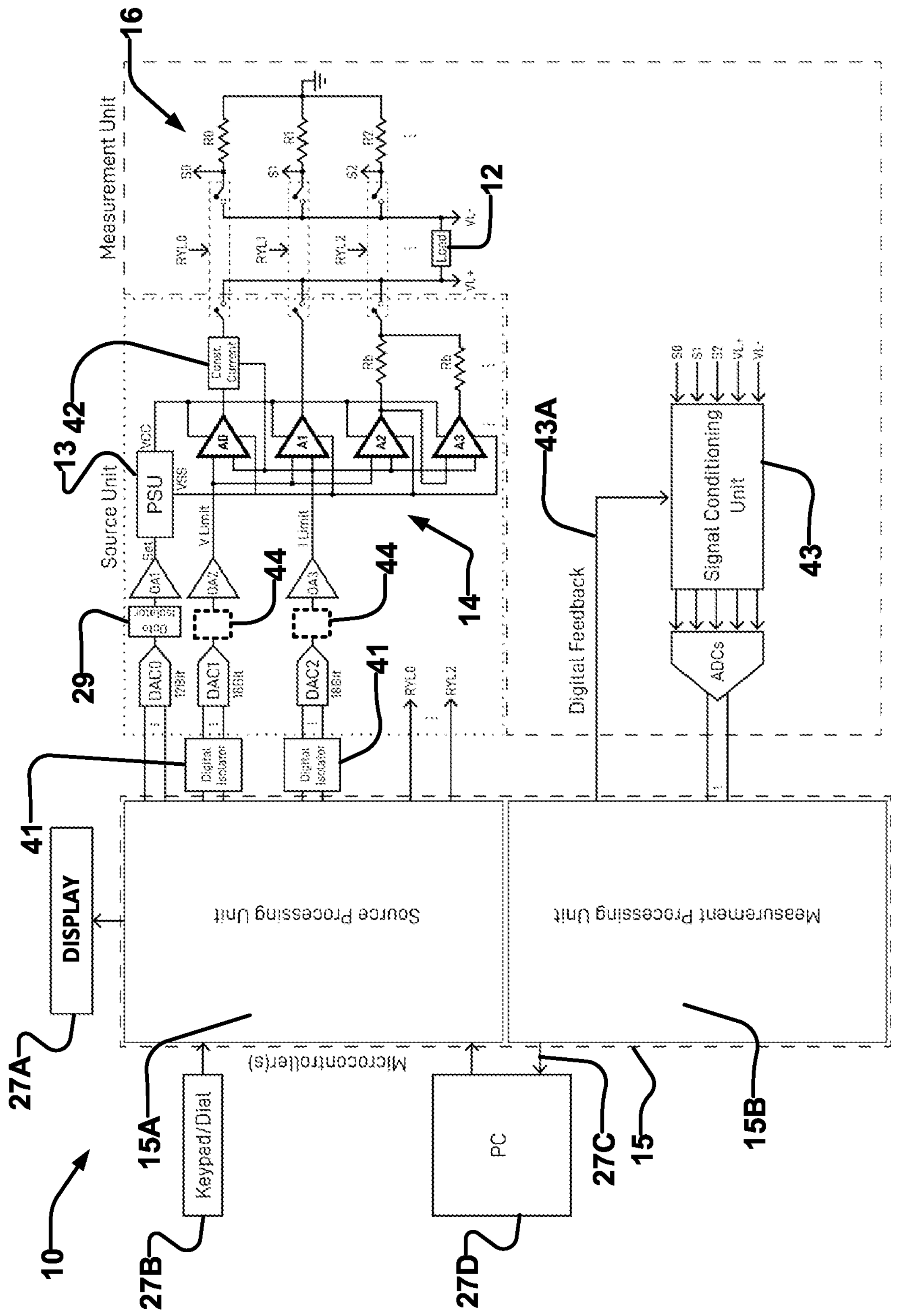
FIG. 2E is an electrical schematic diagram of an example power supply system.

In some embodiments one or more of the input signals (e.g. voltage signal 22-1, current signal 22-2, PSU signal 22-5, etc.) are actively filtered (see e.g. optional filters 44 in FIG. 2E). The active filtering may reduce or remove noise such as flickering noise, EMI induced noise, thermal noise, etc. from the corresponding signal. Additionally, or alternatively, one or more of the input signals may be pre-amplified (e.g. with amplifiers 26). The filtered and/or pre-amplified signal(s) may then pass through a corresponding amplification circuit comprising one or more amplifiers with a set gain. The one or more amplifiers with a set gain may comprise low-pass filters. A low pass filter may, for example, comprise capacitors coupled electrically in parallel to resistors which set a gain of the amplifier. For example, a first capacitor may be coupled in parallel with resistor $R_{f1}$ and a second capacitor may be coupled in parallel with resistor $R_{f2}$ of the circuit shown in FIG. 2D (e.g. forming an integrator circuit). Once the signal has passed through its corresponding amplification circuit, the signal may, for example, be applied across load 12.

In some cases power supply unit 13 is configured to shut down if PSU signal 22-5 goes to 0V. To prevent power supply unit 13 from shutting down, amplifier 26-0 may add a bias voltage amount to PSU signal 22-5 to ensure that PSU signal 22-5 does not go to 0V. In some embodiments amplifier 26-0 also ensures that PSU signal 22-5 always has a positive voltage value. The bias voltage amount may, for example, be from about 0.1 to about 1V. FIG. 2A illustrates an example circuit which may be used to add a bias voltage to PSU signal 22-5.

As shown in FIG. 2A, resistors $R_{ref1}$ and $R_{ref2}$ form a voltage divider which sets a reference voltage ($V_{ref}$). Resistors $R_{in-}$ and $R_{in+}$ may be the same. Resistors $R_f$ and $R_a$ may be the same. When resistors $R_{in-}$ and $R_{in+}$ are the same and resistors $R_f$ and $R_a$ are the same, an output voltage ($V_{out}$) may be determined as follows:

$$V_{out} = \frac{R_f}{R_{in-}}(V_{in} - V_{ref}).$$

In such cases by setting $V_{ref}$ to be less than a lower bound of $V_{in}$, $V_{out}$ will be positive and non-zero irrespective of the magnitude of $V_{in}$ (assuming $V_{in}$ and $V_{ref}$ are positive voltages).

In some embodiments power supply unit 13 is electrically isolated from controller 15. Electrically isolating power supply unit 13 from controller 15 may, for example, reduce (or minimize) noise propagation between controller 15 and power supply unit 13, increase circuit safety (e.g. one side of the circuit failing does not impact the other side) and/or the like. In some embodiments an optical isolator electrically isolates power supply unit 13 from controller 15. FIG. 2B illustrates an example circuit having an optical isolator 29 to electrically isolate power supply unit 13 from controller 15.

In the example embodiment illustrated in FIG. 2, I/O unit 19 comprises a display 27A (e.g. an LCD display, an LED display, an OLED display, etc.), a keypad/dial interface 27B and a network connection 27C to an external computer 27D.

The first amplifier (e.g. amplifier 21-0) may, for example, have a current range of about 0-80 mA. The second amplifier (e.g. amplifier 21-1) may, for example, have a current range of about 70-800 mA. The third amplifier (e.g. amplifier 21-2) may, for example, have a current range of about 350-8,000 mA or about 700-8,000 mA. The fourth amplifier (e.g. amplifier 21-3) may, for example, have a current range of about 350-8,000 mA. In some embodiments the fourth amplifier is the same as the third amplifier. To obtain a higher current rating, additional voltage followers may be cascaded with the third and fourth amplifiers (e.g. amplifiers 21-2 and 21-3). If additional amplifiers are cascaded as described herein, the additional amplifiers may have a resistor coupling their output to the input of a corresponding relay 25 that has a resistance substantially similar to resistor Rb (e.g. within 10%). However, this is not necessary in all cases.

In some embodiments additional amplifiers 21 together with their corresponding relays 25 and sensors 23 may be connected in parallel with other amplifiers 21 in loading circuit 14 to vary a current capacity of loading circuit 14.

In some embodiments a current limiting circuit (e.g. such as the circuit shown in FIG. 2C) may source a constant current when power supply system 10 is operating in a constant current mode. The circuit shown in FIG. 2C may for example source a current in a range of about 0 mA to about 80 mA. Similar circuits to the one shown in FIG. 2C may source a current in a range of about 80 mA to about 800 mA, about 800 mA to about 16 A, etc. In some cases a similar circuit to the one shown in FIG. 2C may source a current with nanoampere resolution.

In some embodiments power supply system 10 has a voltage range of 0V to 36V. The voltage resolution may, for example, be about 0.1 mV. In some embodiments power supply system 10 has a current range of 0 A to 16 A. The current resolution may, for example, be about 0.1 mA.

In some embodiments power supply system 10 is a multi-range power supply. In some embodiments power supply system 10 is configurable to provide μW to kW power (e.g. about 1 μW to about 1 MW). In some embodiments a single power supply system 10 may provide μW to kW power. In some embodiments individual electrical components of power supply system 10 may be selected (e.g. amplifiers 21 (type of amplifier, number of amplifiers, etc.), power supply unit 13, etc.) to configure power supply system 10 to provide a desired power range (e.g. μW power, kW power, etc.).

As described elsewhere herein I/O unit 19 may comprise a network connection to an external computer. The network connection may be wired or wireless. By connecting power supply system 10 to a computer, power supply system 10's functionality may be expanded. For example, power supply system 10 may be configured to include additional functionality via a graphic user interface (GUI) running on the computer. In some embodiments a user may gain full control of the hardware (e.g. sensors 16, etc.) of power supply system 10 through the computer.

The computer may, for example, provide additional memory and data processing capabilities (e.g. graphical display of data, data logging, programming capabilities, etc.). In some embodiments power supply system 10 comprises a physical interface (e.g. buttons, knobs, touchscreen inputs, etc.) permitting user control of core functions (e.g. setting voltage, power, current values, etc.) of power supply system 10. The physical interface may advantageously permit a user to control power supply system 10 independent of (optional) connection to a computer. In some embodiments the physical interface includes one or more controls operable to permit a user to change an operational mode of power supply system 10 (e.g. from a power supply to a multi-meter measuring device, from a constant power supply to constant voltage power supply, etc.).

An example expanded functionality of power supply system 10 is to effectively convert power supply system 10 into an interface for one or more analog sensors (e.g. by connecting an analog sensor to power supply system 10 rather than a load 12 the outputs of the one or more analog sensors may be provided to controller 15 for processing). In some embodiments power supply system 10 logs measured data (e.g. measured voltage data, measured current data, etc.). The logged data may be processed in real time or stored for later processing. In some cases a user may activate sensors 16 (e.g. via relays 25 shown in FIG. 2) without activating loading circuit 14 thereby effectively converting power supply system 10 into a precision multimeter. In some cases a user couples probes (e.g. "sensing probes") to power supply system 10 (e.g. via input ports of power supply system 10). The sensing probes may be internally connected as a load 12 such that voltage and current may be measured.

In some embodiments power supply system 10 comprises five user accessible connection points (e.g. two sensing connection points, two force or excitation connection points and one ground connection point). The connection points may be used in various ways to perform various voltage and/or current measurements. For example a device may be connected across the two force connection points which drive a current through the device. Voltage may be measured across the sensing connection points. To compensate for voltage loss (e.g. in wiring, PCB traces, etc.) voltage may be measured directly across the sensing connection points (or the force connection points). As shown in FIG. 2D a differential amplifier (e.g. an amplifier 21) which applies voltage to a load may be configured in some embodiments to measure voltage directly at the output of a digital to analog converter (DAC) and at terminals VL+ and VL− to compensate for voltage loss. For simplicity, relays 25 and current sensors 23 have not been illustrated in FIG. 2D. Input $V_{in+}$ may be physically coupled directly to an output of a digital to analog converter (DAC) which generates signal 22-1 or 22-2. In some embodiments input $V_{in+}$ is physically coupled to an output of amplifier 26-1 or 26-2. Input $V_{in-}$ may be coupled to ground. In some embodiments, to minimize voltage loss, input $V_{in+}$ is physically coupled as close as possible to the respective DAC output or output of amplifier 26-1 or 26-2 as possible. Likewise, in some embodiments input $V_{in-}$ is coupled as close as possible to the ground connection of the respective DAC or a common ground plane. As described elsewhere herein, various connection permutations may be configured by a user with a switch, dial and/or the like.

Additionally, or alternatively, a user may, for example, configure power supply system 10 to perform:

- 4-point and 4-line probe measurements (A 4-point or 4-line probe measurement may be performed by coupling a sample to be measured (e.g. a sheet of material) to power supply system 10 as a load 12 and applying a constant current to the sample. Two additional sensing probes may be coupled to a portion of the sample to measure the voltage drop across the portion of the sample. The voltage may be measured by coupling the sensing probes to the voltage sensing circuitry of power supply system 10 described elsewhere herein. Resistance of the sample (or the section of the sample between the two sensing probes) may be determined from the measured voltage and the known current that is applied to the sample.);
- cyclic voltammetry to measure current-voltage (I-V) characteristics of an electrochemical cell (e.g. a voltage drop in a solution is compensated by servo controlling a voltage that is applied with the sensing probes);
- electro-impedance spectroscopy;
- open-circuit voltage monitoring;
- precision voltage and/or current monitoring;
- battery tests;
- etc.

In some embodiments power supply system 10 comprises a user operated switch (e.g. a mechanical switch or an electronic switch) which couples the sensing probes to loading circuit 14 and controller 15 (e.g. to sensors 23, relays 25, feedback loops of amplifiers 21, etc.). As described elsewhere herein one sensing probe may, for example, be coupled to the high side (VL+) node coupling for a load 12 and another sensing probe may be coupled to the low side (VL−) node coupling for load 12. Loading circuit 14 (and/or controller 15) may be configured to compensate for any voltage loss along the sensing probes (e.g. voltage loss along probes which connect a sample being measured to "force" terminals of system 10), resistance of the sensing probes, etc. In some embodiments power supply system 10 comprises filters which condition the signals received from the sensing probes. In some embodiments at least one of the filters comprise electronic circuit elements. In some embodiments at least one of the filters comprises an analog filter (e.g. a passive analog filter). In some embodiments at least one of the filters is implemented on controller 15. In some embodiments at least one of the filters comprises a digital filter. The digital filter may, for example, average current and/or voltage measurements across a measurement window.

In some cases power supply system 10 may control a parameter such as temperature of a dynamic load 12 by varying the power that is dissipated by load 12. By relating the parameter to be controlled to the power that is dissipated by load 12, advantageously the parameter may be controlled without the use of an external sensor or sensors (e.g. a temperature sensor) that can directly sense the parameter. This may resolve issues such as placing temperature sensors close to fine heating elements such as heating elements in micro-3D printing, drug delivery systems, drug delivery system fabrication tools, micro heaters for liquid crystal displays, thermal actuators, Peltier modules, dynamic mechanical analyzers, etc. Examples of dynamic load devices which may be controlled in such manner include:
- thermal-based sensors (e.g. plant water status measurement sensors, seepage meters, mass flow meters, anemometers, gas monitoring meters, downward flow meters including very slow downward flow meters, etc.);
- thermal actuators (e.g. nylon actuators, shape memory alloy actuators, etc.);
- energy storage devices (e.g. batteries, supercapacitors, etc.);
- lighting devices (e.g. LEDs, etc.);
- piezo actuators;
- thermal devices such as heating and/or cooling elements;
- ion sources (e.g. a focus ion beam system);
- electron beam sources (e.g. a scanning electron microscope (SEM));
- etc.

By managing a control parameter (or parameters) by controlling power that is applied to load 12 overall performance, cycle life and/or the like of load 12 may be improved.

A relationship of input power (P) to a first-order system with control variable x may, for example, be represented as follows:

$$P = \frac{dE}{dt} = \sum_{i=1}^{n}\left(F_i\left(\frac{dx}{dt}\right) + G_i(x) + C_i\right)$$

where $F_i$ is a linear function of dx/dt, $G_i$ is a linear function of x and $C_i$ is a constant. At steady-state dx/dt is zero and therefore input power (P) becomes a linear function of x (i.e. the control variable). To control x the input power that is provided to load 12 may be controlled by controller 15 based on voltage and current feedback signals (e.g. signals from voltage sensor 16A and current sensor 16B) eliminating the need for additional sensors.

Although the above describes a linear relationship, a linear relationship is not required in all cases. As long as power can be correlated to the parameter to be controlled, the parameter may be controlled by controlling the power that is dissipated by load 12.

Figure 3:
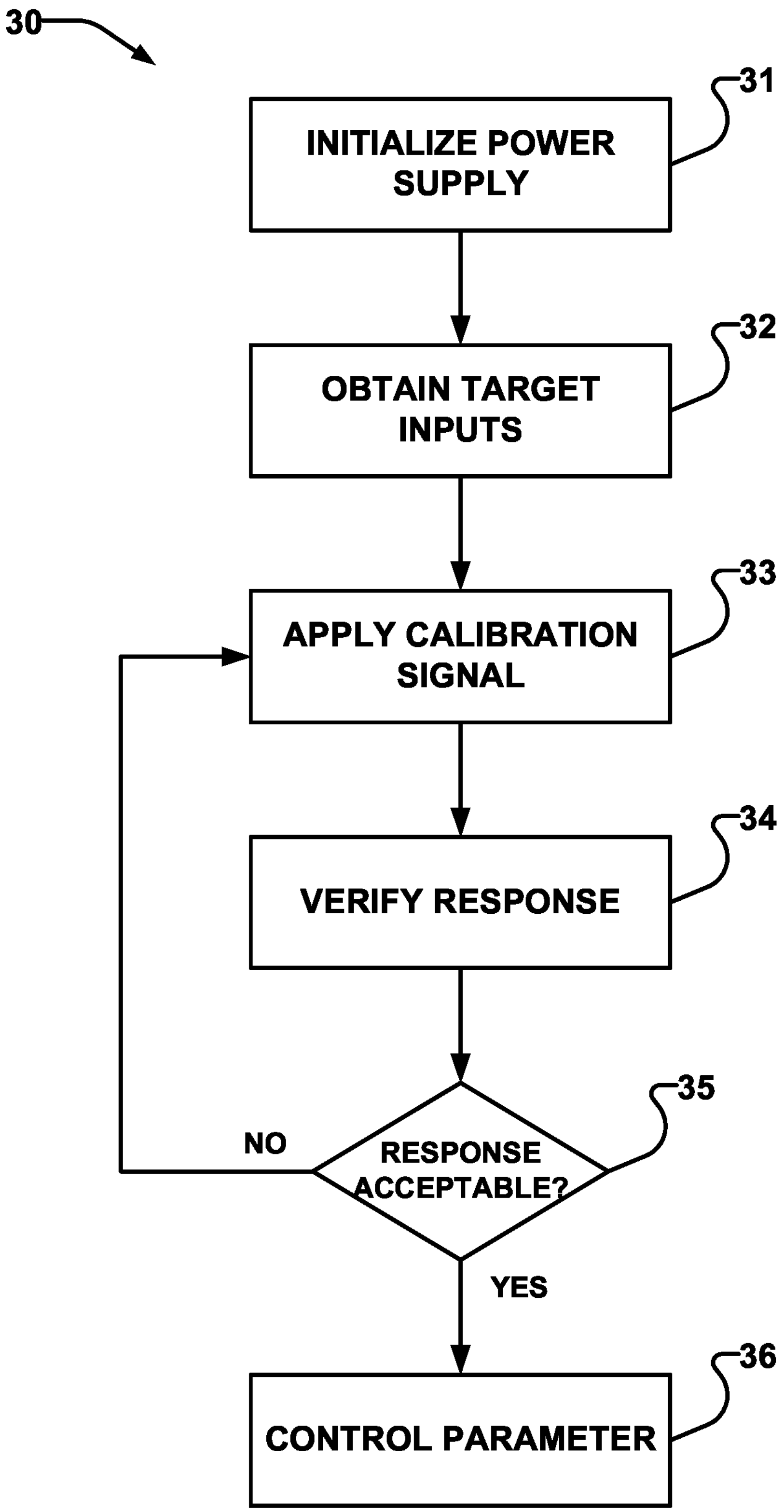
FIG. 3 is a flow chart illustrating an example method.

FIG. 3 illustrates an example method 30 for controlling a control parameter such as temperature of load 12, electric charge stored in load 12 (e.g. when load 12 is a battery or any other electrical energy storage device), temperature or power dissipation of load 12 (e.g. when load 12 is a heating or cooling element), light intensity of load 12, strain or stress of load 12 (e.g. when load 12 is an actuator), etc.

In block 31 power supply system 10 is initialized. Initializing power supply system 10 may, for example, comprise one or more of the following:
- configuring sensors 23 (e.g. configuring mean read time, sampling frequency, averaging window, etc.);
- configuring I/O pins (e.g. GPIO pins) of controller 15;
- initializing digital to analog converters;
- initializing I/O elements (e.g. displays, LED indicators, dials, buttons, etc.);
- initializing memory (e.g. Flash memory);
- retrieving stored data (e.g. settings, configuration parameters, etc.) from memory;
- etc.

In block 32 target values are obtained from a user. For example, block 32 may obtain one or more of the following:
- a target value for the control variable (e.g. a target temperature);
- a maximum voltage that can be safely applied;
- a maximum current that can be safely applied;
- a mode of operation;
- a measure of accuracy for voltage and/or current measurements;
- etc.

In some embodiments parameters such as control settings, target values, etc. may be stored. Block 32 may retrieve such parameters from memory. In some cases retrieving such parameters from memory is faster than soliciting such parameters from a user. In some embodiments a user may vary one or more target values in real time (e.g. via I/O 19). In some cases a user edits current, voltage and/or power settings in real time.

In block 33 power supply system 10 applies a calibration signal to load 12. For example power supply system 10 may ramp power e.g. non-linearly. Such ramping may last a few hundred milliseconds to a few seconds depending on characteristics of load 12. A response of load 12 to the ramping may be measured by sensors 16. Controller 15 may determine optimal or suitable settings (e.g. voltage and/or current for which a target power is achieved) to minimize a ramping period and therefore have a faster convergence of the target power needed to control the parameter as desired. In some embodiments one or more of the settings are stored. The settings may be retrieved from memory prior to load 12 being excited.

In block 34 the measured response of load 12 is verified. In some embodiments the measured response of load 12 may be compared against an expected response of load 12. The expected response may, for example, be determined from laboratory experiments. In some embodiments external sensors configured to measure a parameter of load 12 (e.g. temperature) while the calibration signal is being applied in block 33 measure the parameter of load 12 in real time. Such measurements may then be used to verify the measured response of load 12. In some embodiments the measured response of load 12 is compared to target values specified by a user.

In block 35 method 30 determines whether the measured response is acceptable based on the verification performed in block 34. If the measured response is acceptable method 30 proceeds to block 36. Otherwise method 30 returns to block 33. If method 30 returns to block 33 the same or a different calibration signal may be applied in block 33.

In block 36 the power applied to load 12 is controlled by controller 15 to maintain a parameter (e.g. temperature) of load 12 within a desired range. In some embodiments the power applied to load 12 is controlled by a PID controller (performed on controller 15) which receives feedback from sensors 16 (e.g. voltage sensor 16A and/or current sensor 16B or any other sensor).

In some embodiments power supply system 10 comprises a trained machine learning module 40 (see e.g. FIG. 1). Trained machine learning module 40 may comprise a neural network trained to recognize load characteristics of a specific load. Machine learning module 40 may, for example, be trained using laboratory obtained data. Once trained, a load of the type machine learning module 40 is trained to recognize may be excited in an open loop scheme (e.g. does not require feedback) by loading circuit 14 to keep a parameter (such as temperature) within a desired range.

In some embodiments machine learning module 40 is trained to generate an output that indicates a desired parameter such as temperature based on sensor values (e.g. voltage values, current values, etc.) which are input into machine learning model 40. Advantageously machine learning module 40 may facilitate controller 15 dynamically adapting control of power supply system 10 based on different loads 12 being coupled to power supply system 10.

Machine learning module 40 may receive as input operational parameters of a load. For example the operational parameters may comprise voltage, current, temperature, force, light intensity, resistance, etc. Machine learning module 40 may also receive as input target operational parameters (e.g. target voltage, target current, target power, target temperature, etc.). In some cases information about load 12 (e.g. type of device, model number, etc.) is also provided as input to machine learning module 40.

Machine learning module 40 processes input data, from the input data determines characteristics of load 12 and outputs current and/or voltage excitation signals that should be applied to load 12 to achieve the user desired target operational parameters for load 12.

In some embodiments machine learning module 40 continuously learns (e.g. updates weights (or other trainable parameters) of nodes in the neural network) as different loads 12 are coupled to power supply system 10. A user may optionally enable or disable such continuous learning.

In some embodiments machine learning module 40 is trained to determine characteristics of a load 12 (e.g. determine an I-V behavior of the load) based on a measured response to an excitation signal that was applied to the load. The excitations signal may be a voltage signal, a current signal, a power signal and/or the like. In some embodiments the excitation signals result in less than about 100 W being applied to load 12. In some embodiments the excitation signals result in less than about 10 W being applied to load 12. In some embodiments the excitation signals result in less than about 1 W being applied to load 12.

In some embodiments machine learning module 40 and/or power supply system 10 can determine characteristics of a load 12 (e.g. determine an I-V behavior of the load) even if excitation signals that are applied to load 12 result in large power amounts (e.g. 1 kW-1 MW power) being applied to load 12. Such loads are typically large-scale battery packs, fuel cells, supercapacitor banks, etc.

In some embodiments one or more components such as a digital-to-analog converter, a serial peripheral interface (SPI), an I2C component, etc. may be digitally isolated (e.g. using one or more digital isolators) from controller 15. Digitally isolating components may, for example, reduce digital noise propagation into analog signals, prevent damage to controller 15 if an adverse downstream event occurs (e.g. oscillation in one or more amplifiers, a short circuit spike, back EMF from inductive loads, etc.) and/or the like.

Power dissipated by one or more amplifiers 21 may, for example, be determined as follows:

$$P_{dissp} = I_{load} \times (V_{PSU} - V_{out})$$

where:

$$V_{PSU} = m \times DAC + V_{offset}$$

$$V_{out} = V_{L+}$$

and where $I_{load}$ represents current applied to load 12, DAC corresponds to the input value of the digital-to-analog converter (DAC) which generates the input signal for power supply unit 13 (e.g. input signal 22-5) and m and $V_{offset}$ are parameters determined during calibration of power supply unit 13 and the DAC which generates the input signal for power supply unit 13.

If the determined dissipated power exceeds a desired threshold, one or more amplifiers 21 may be shut down (e.g. to prevent damaging amplifiers 21). Additionally, or alternatively, system 10 may comprise one or more temperature sensors positioned proximate to corresponding amplifiers 21. For example, a thermistor may be placed in thermal contact with (e.g. under, next to, etc.) an amplifier 21. If a measured temperature exceeds a threshold temperature, then the corresponding amplifier 21 may be shut down, one or more additional amplifiers 21 may be activated, a cooling mechanism (such as a fan) may be turned on or ramped up, etc.

In some embodiments calibration (e.g. of system 10, of individual components of system 10 (e.g. a DAC), etc.) is performed intermittently or periodically (e.g. by controller 15, a computer configured to calibrate system 10, etc.). For example, an output from a DAC used to set a value of a target voltage or current (e.g. generate signal 22-1 or 22-2) may drift due to temperature changes, performance degradation, etc. In some embodiments if a measured value (e.g. a measured value of a parameter) deviates from a reference value (e.g. a desired value for the parameter) by more than a threshold amount, a component whose value has deviated by more than the threshold amount is re-calibrated. In some embodiments controller 15 monitors measured values and autonomously initiates re-calibration of individual components, system 10, etc.

In some embodiments as shown in, for example, FIG. 2E controller 15 comprises a plurality of modules. For example, controller 15 may comprise a power source module 15A for controlling provision of power and a measurement module 15B for controlling measuring of performance parameters (e.g. voltage across load 12, current passing through load 12, etc.). Additionally, or alternatively, as shown in FIG. 2E, system 10 optionally comprise one or more of the following:

- one or more optical isolators 29;
- one or more digital isolators 41;
- a current limiting module 42 comprising a circuit such as the circuit shown in FIG. 20;
- a signal conditioning module 43 which is configured to condition input signals for processing by controller 15;
- one or more optional filters 44.

A digital feedback signal 43A may be input into signal conditioning module 43. Digital feedback signal 43A may provide feedback for varying parameters of the conditioning performed by signal conditioning module 43.

Another aspect of the technology described herein provides systems and methods for high precision voltage measurement. As described elsewhere herein the systems and methods for high precision voltage measurement may be used separately from (e.g. to measure voltages generally, etc.) or together with power supply system 10 and its associated methods (e.g. to measure a voltage across load 12 with high precision, etc.).

Figure 4:
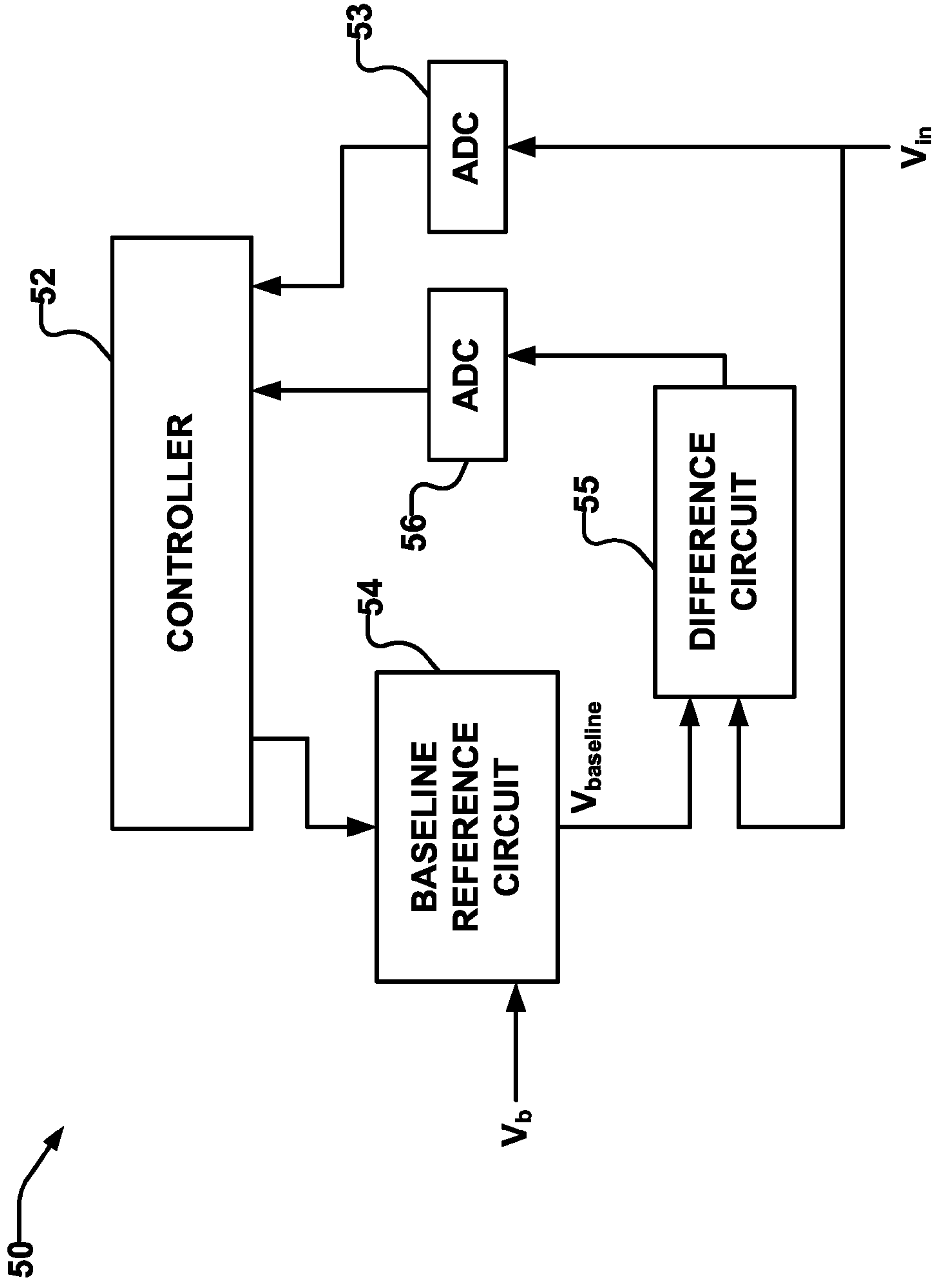
FIG. 4 is a block diagram of a circuit according to an example embodiment of the present technology.

FIG. 4 is a block diagram of a circuit 50 for converting analog input voltage signals to digital values with high precision. Circuit 50 receives an input analog voltage signal ($V_{in}$) which is processed and converted to N-bit digital values to be received by controller 52.

In some embodiments controller 52 is the same as controller 15. To limit the influence of adverse factors such as noise, flickering, resolution limits, etc. on the value of the least significant bit (or a plurality of the least significant bits) of the digital values, the portion of $V_{in}$ corresponding to the least significant bit (or plurality of the least significant bits) may be isolated and measured with higher precision by circuit 50. Circuit 50 may provide high precision voltage measurement for a wide voltage range. Such high precision may advantageously be independent of the voltage range. In some embodiments circuit 50 measures voltages in a range from 0V to 36V. In some embodiments circuit 50 measures voltages in a range from 0V to 85V. In some embodiments circuit 50 measures bipolar voltages (e.g. from −36V to 36V, from −85V to 85V, etc.). In some embodiments circuit 50 measures negative voltages (e.g. from −36V to 0V, from −85V to 0V, etc.).

$V_{in}$ is received by an analog-to-digital converter (ADC) 53. ADC 53 comprises an N-bit ADC that is configured to sample and convert $V_{in}$ into a set of N-bit digital values. ADC 53 has a step size Δ (i.e. the voltage difference between one digital level and the next digital level). Controller 52 receives the digital values corresponding to $V_{in}$ from ADC 53.

Controller 52 is also configured to control baseline reference circuit 54 to generate a voltage signal ($V_{baseline}$) which can be used by difference circuit 55 to isolate the portion of $V_{in}$ that corresponds to the least significant bit (or plurality of the least significant bits) of the digital value. Controller 52 may, for example, determine the value of $V_{baseline}$ by:

i) dividing $V_{in}$ by the step size Δ of ADC 53;
ii) rounding the result down to the nearest integer value; and
iii) multiplying the nearest integer value by the step size Δ of ADC 53.

In some embodiments controller 52 is configured to control baseline reference circuit 54 to generate $V_{baseline}$ which can be used by difference circuit 55 to isolate the portion of $V_{in}$ that corresponds to uncertain (or potentially uncertain) bits of the digital value (e.g. 3 least significant bits, 2 least significant bits, etc.). In such embodiments the systems and methods described herein may be modified to determine the uncertain bits with higher precision and not just the least significant bit.

Baseline reference circuit 54 comprises a programmable voltage source. In some embodiments baseline reference circuit 54 comprises a high precision digital-to-analog converter (DAC) or other voltage generating device. In some embodiments controller 52 controls the DAC to generate $V_{baseline}$. The values for $V_{baseline}$ may be determined based on the output of ADC 53. In some embodiments the output of the DAC is conditioned. For example, the output of the DAC may be amplified to minimize noise impacts, etc. In such embodiments controller 52 may control the DAC to generate a voltage signal that is equivalent to $V_{baseline}$ divided by the gain of the conditioning amplifier.

In some embodiments baseline reference circuit 54 receives as input a bias voltage signal ($V_b$) that is to be combined with $V_{baseline}$. $V_b$ may be combined with $V_{baseline}$ to nullify any offset or bias voltage that may be introduced by one or more components of baseline reference circuit 54. In some embodiments $V_b$ is fixed. In some embodiments $V_b$ may be dynamically varied in real time based on varying offset or bias voltages that may be introduced by one or more components of baseline reference circuit 54. In some embodiments $V_b$ is varied to nullify any offset or bias voltage that is introduced by one or more of the components that make up a particular baseline reference circuit 54. In some embodiments controller 52 sets a value of $V_b$ (e.g. based on a measured offset voltage generated when a DAC of baseline reference circuit 54 is set to zero).

In some embodiments baseline reference circuit 54 and/or controller 52 are configured to compensate for potential voltage drifts caused by a change of temperature of one or more components (e.g. a DAC) of baseline reference circuit 54. In some embodiments baseline reference circuit 54 comprises an analog circuit configured to compensate for a voltage drift caused by a change in temperature. In some embodiments baseline reference circuit 54 comprises a digital circuit configured to compensate for a voltage drift caused by a change in temperature. In some embodiments baseline reference circuit 54 comprises both analog and digital components which are configured to compensate for a voltage drift caused by a change in temperature. In some embodiments controller 52 controls one or more components of base line reference circuit 54 (e.g. a DAC) to compensate for a voltage drift caused by a change in temperature.

In some embodiments the analog or digital circuits configured to compensate for a voltage drift comprise a temperature sensor. Such temperature sensor may be located to sense a temperature of a component (e.g. a DAC or other voltage generating device) of baseline reference circuit 54. For example, an output of the temperature sensor may be used to look up or calculate a temperature compensation factor. As another example, the output of the temperature sensor may be supplied as an input to a circuit that outputs a temperature compensation voltage based on the input temperature signal. The temperature compensation factor or temperature compensation voltage may be received by baseline reference circuit 54 and/or controller 52 and may be used to vary $V_{baseline}$ or $V_b$ to compensate for the voltage drift caused by the detected change in temperature.

In some embodiments baseline reference circuit 54 comprises one or more filters configured to remove (or suppress) noise and/or other artifacts from $V_{baseline}$.

Difference circuit 15 receives as input $V_{in}$ and $V_{baseline}$ and isolates the portion of $V_{in}$ corresponding to the least significant bit (or a plurality of the least significant bits as described elsewhere herein) of the digital values output from ADC 53. For example, difference circuit 55 may subtract $V_{baseline}$ from $V_{in}$ and may amplify the difference. In some embodiments difference circuit 55 comprises a differential amplifier.

The amplified difference may be input into ADC 56 and controller 52 may receive the digital values from ADC 56. To determine the actual value of the least significant bit, controller 52 may, for example, divide the received digital values from ADC 56 by the gain of difference circuit 55. Controller 52 may then replace the values of the least significant bit from ADC 53 with the newly determined values of the least significant bit (i.e. using the values from ADC 56) to yield higher precision digital values of $V_{in}$.

Preferably, ADC 53 and ADC 56 are operated concurrently.

In some embodiments ADC 53 and ADC 56 comprise identical ADCs configured in the same manner. In some embodiments ADC 53 and ADC 56 may be replaced by a single ADC. A multiplexer may, for example, be used to select whether the single ADC receives $V_{in}$ or the output signal of difference circuit 55 as input.

In currently preferred embodiments ADCs 53 and 56 comprise delta-sigma ($\Delta\Sigma$) ADCs.

In some embodiments controller 52 verifies that baseline reference circuit 54 and/or difference circuit 55 are configured properly. For example, if the value determined by ADC 56 is greater than the value determined by ADC 53 multiplied by the gain of difference circuit 55 then one or both of baseline reference circuit 54 and difference circuit 55 are not configured properly. In such case controller 52 may wait until baseline reference circuit 54 and/or difference circuit 55 are configured properly before proceeding, may reconfigure baseline reference circuit 54 and/or difference circuit 55, etc.

In some embodiments a reference voltage ($V_{ref}$) is used to calibrate baseline reference circuit 54 and/or difference circuit 55.

For example, by controlling a DAC (or other voltage generating device) of baseline reference circuit 54 to generate a voltage which is intended to match the value of $V_{ref}$ and determining the difference between the actual voltage generated by the DAC (or other voltage generating device) and $V_{ref}$ a relationship (e.g. a linear relationship, step wise linear relationship, a relationship comprising a curve of higher order, etc.) between inputs and outputs can be determined for baseline reference circuit 54 and/or difference circuit 55 to compensate for any drifts or offsets introduced by baseline reference circuit 54 and/or difference circuit 55. In some embodiments a plurality of different reference voltages are used to increase the accuracy of the determined relationship. As an example, $V_{ref}$ may be 0V and 2.5V. In some embodiments more than three different reference voltages are used.

As another example, a DAC (or other voltage generating device) of baseline reference circuit 54 may be controlled to generate a voltage that matches $V_{ref}$. Based on the input value to the DAC (or other voltage generative device) required to match $V_{ref}$ a relationship between inputs and outputs can be determined for baseline reference circuit 54 and/or difference circuit 55 to compensate for any drifts or offsets introduced by baseline reference circuit 54 and/or difference circuit 55.

$V_{ref}$ may, for example, be introduced using a switch such as a relay (see e.g. relay 65 shown in FIG. 5A), a multiplexer (e.g. an analog multiplexer) and/or the like. Once the calibration is complete, the switch may, for example, couple $V_{in}$ to difference circuit 55.

In some embodiments such calibration is performed intermittently or periodically.

In some embodiments $V_{ref}$ is used to determine a relationship (e.g. a linear relationship) between the input and output of, for example, a DAC of baseline reference circuit 54.

In some embodiments $V_{ref}$ is generated by an electrical component that can generate a stable voltage that is accurate to at least five decimal points. In some embodiments $V_{ref}$ is generated by an electrical component that can generate a stable voltage that is accurate to at least three decimal points. In some embodiments voltage drift of such electrical component may be less than about 10 ppm/° C.

In some embodiments to reduce noise analog components are powered with a different power supply than the power supply that powers the digital components of circuit 50. The different power supplies may be electrically isolated from one another with isolated ground planes. In some such embodiments circuit 50 also comprises isolation components (e.g. $I^2C$ isolators, SPI isolators, etc.).

Figure 5:
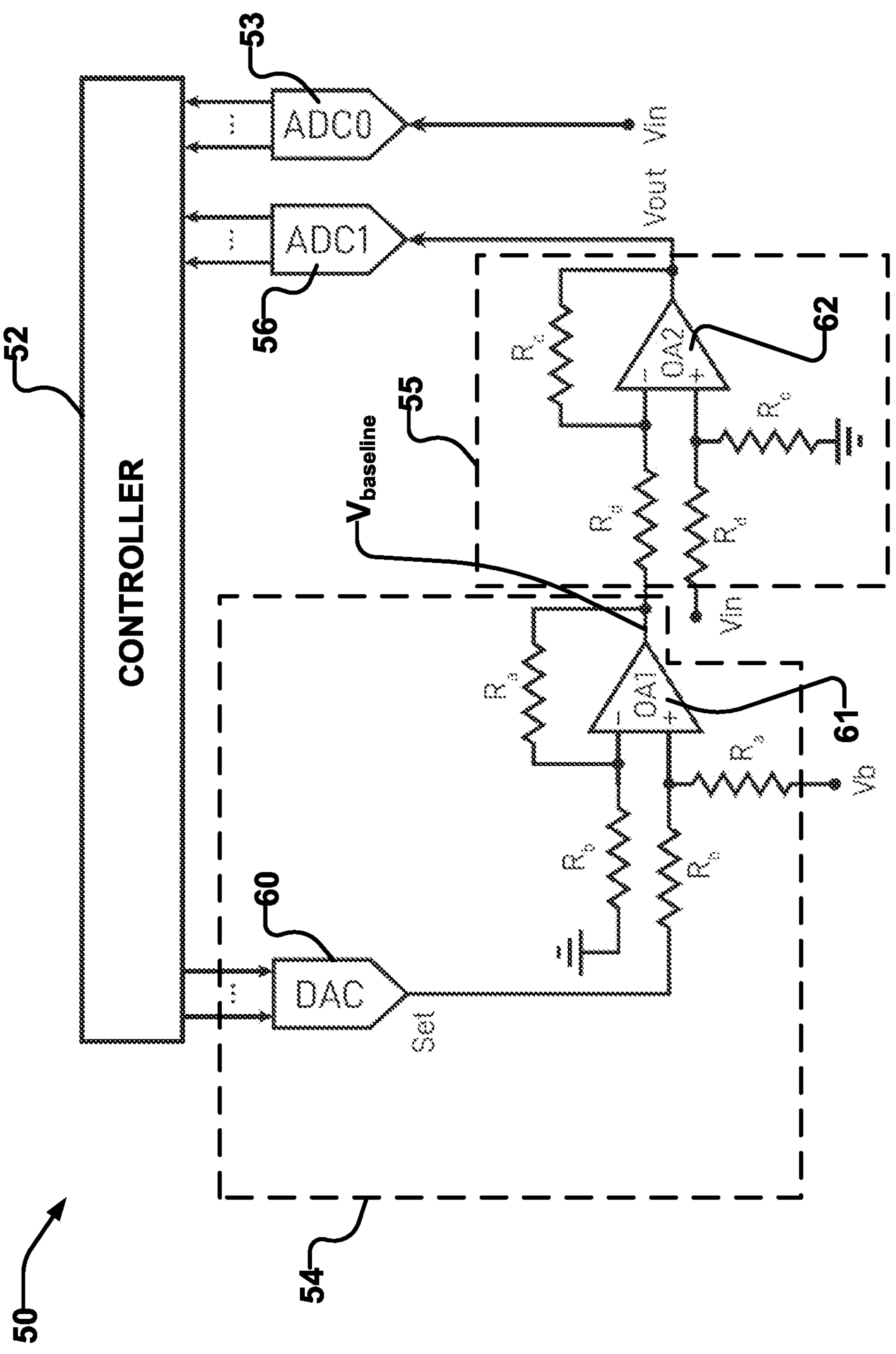
FIG. 5 is a schematic diagram of an example embodiment of the circuit of FIG. 4.
Figure 5A:
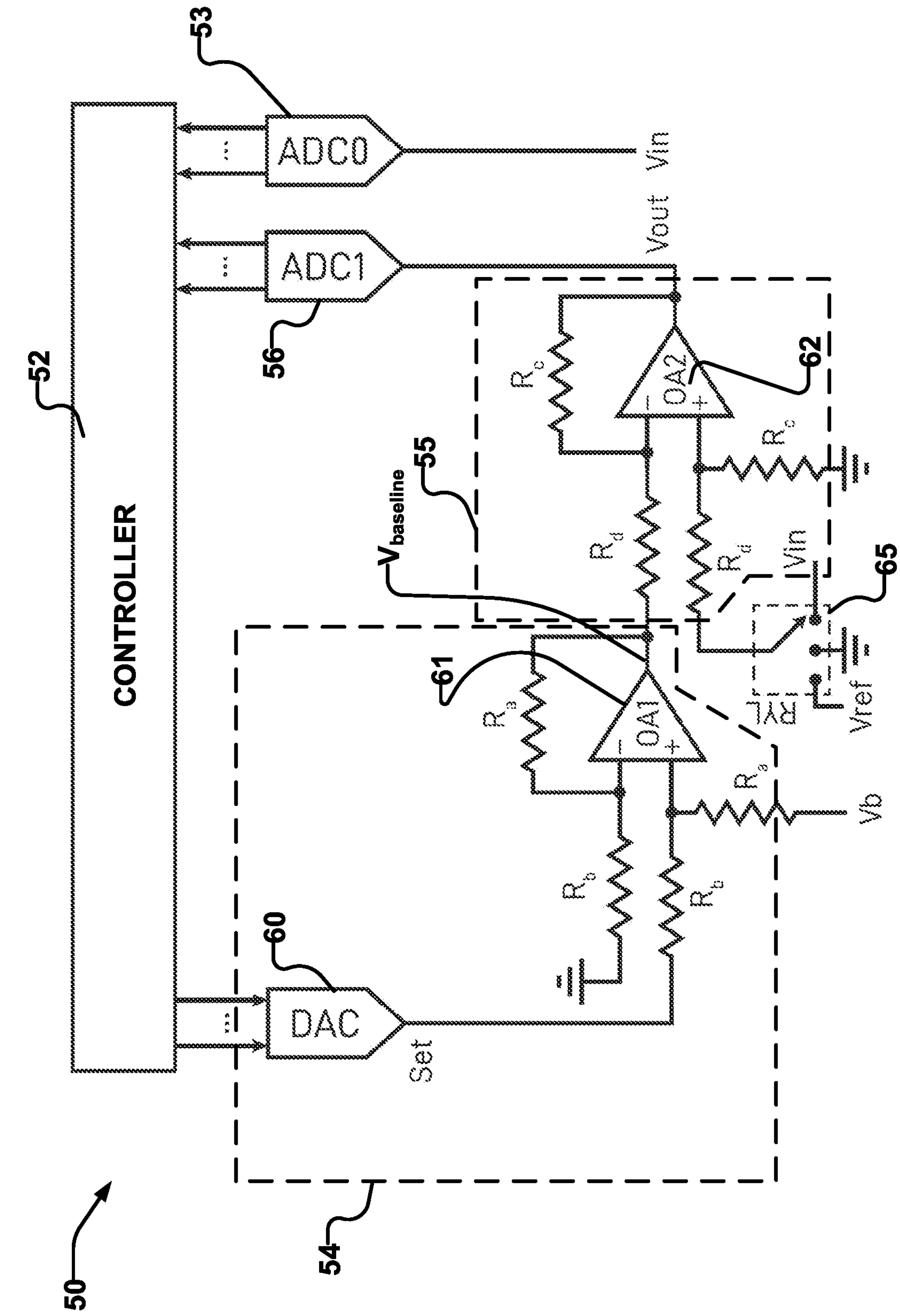
FIG. 5A is a schematic diagram of an example embodiment of the circuit of FIG. 4.

FIG. 5 is a schematic electrical circuit diagram of an example embodiment of circuit 50.

As shown in FIG. 5, baseline reference circuit 54 may comprise a DAC 60 and an amplifier 61. Resistors $R_a$ and $R_b$ configure a gain of amplifier 61. In some embodiments the gain of amplifier 61 is 2. In some embodiments the gain of amplifier 61 is greater than 2. In some embodiments the gain of amplifier 61 is less than 2.

Difference circuit 55 may comprise an amplifier 62. Resistors $R_c$ and $R_d$ configure a gain of amplifier 62. In some embodiments the gain of amplifier 62 is less than 100. In some embodiments the gain of amplifier 62 is less than 50. In some embodiments the gain of amplifier 62 is set such that the gain multiplied by the step size $\Delta$ of ADC 53 does not saturate amplifier 62.

Figure 6:
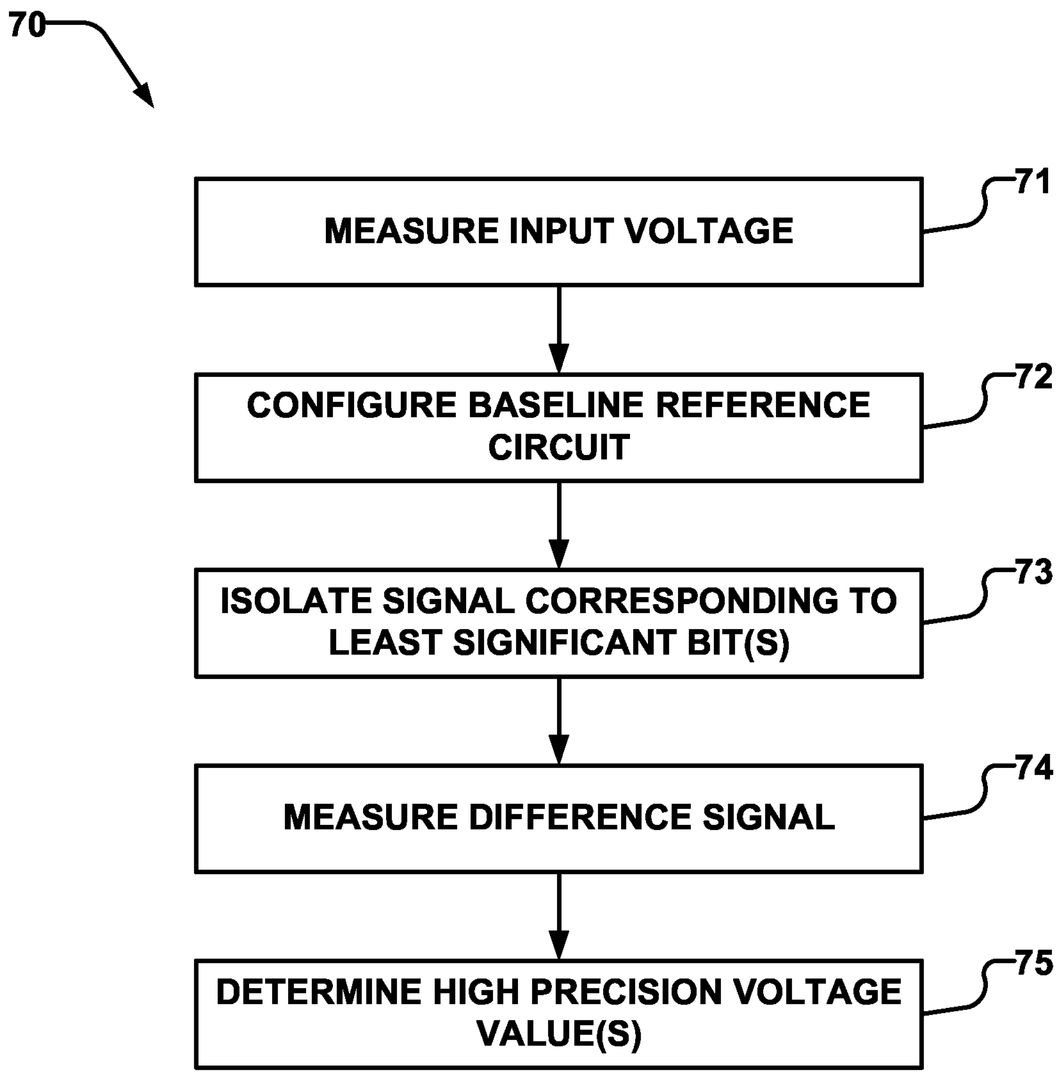
FIG. 6 is a flow chart illustrating an example method.

FIG. 6 is a block diagram showing an example method 70 for converting an analog signal to digital values with high precision.

In block 71 an analog signal (e.g. $V_{in}$) is converted to a digital value (or set of digital values) using an ADC (e.g. ADC 53). The digital value(s) may be provided to a controller (e.g. controller 52).

Based on the digital value(s) a baseline voltage (e.g. $V_{baseline}$) to isolate the portion of the analog signal corresponding to the least significant bit may be determined in block 72. In block 72 a circuit (e.g. baseline circuit 54) may also be configured by the controller to generate the baseline voltage.

In block 73 the portion of the analog signal corresponding to the least significant bit is isolated from the input analog signal. As described elsewhere herein, block 73 may comprise subtracting the baseline voltage from the input analog signal. Block 73 may additionally comprise amplifying the portion of the analog signal corresponding to the least significant bit.

In block 74 the portion of the analog signal corresponding to the least significant bit is converted to a digital value (or set of digital values) (e.g. using ADC 56). Such digital value(s) may be used by the controller in block 75 to replace the least significant bit of the digital value(s) from block 71 resulting in higher precision digital value(s) corresponding to the analog signal.

Figure 7:
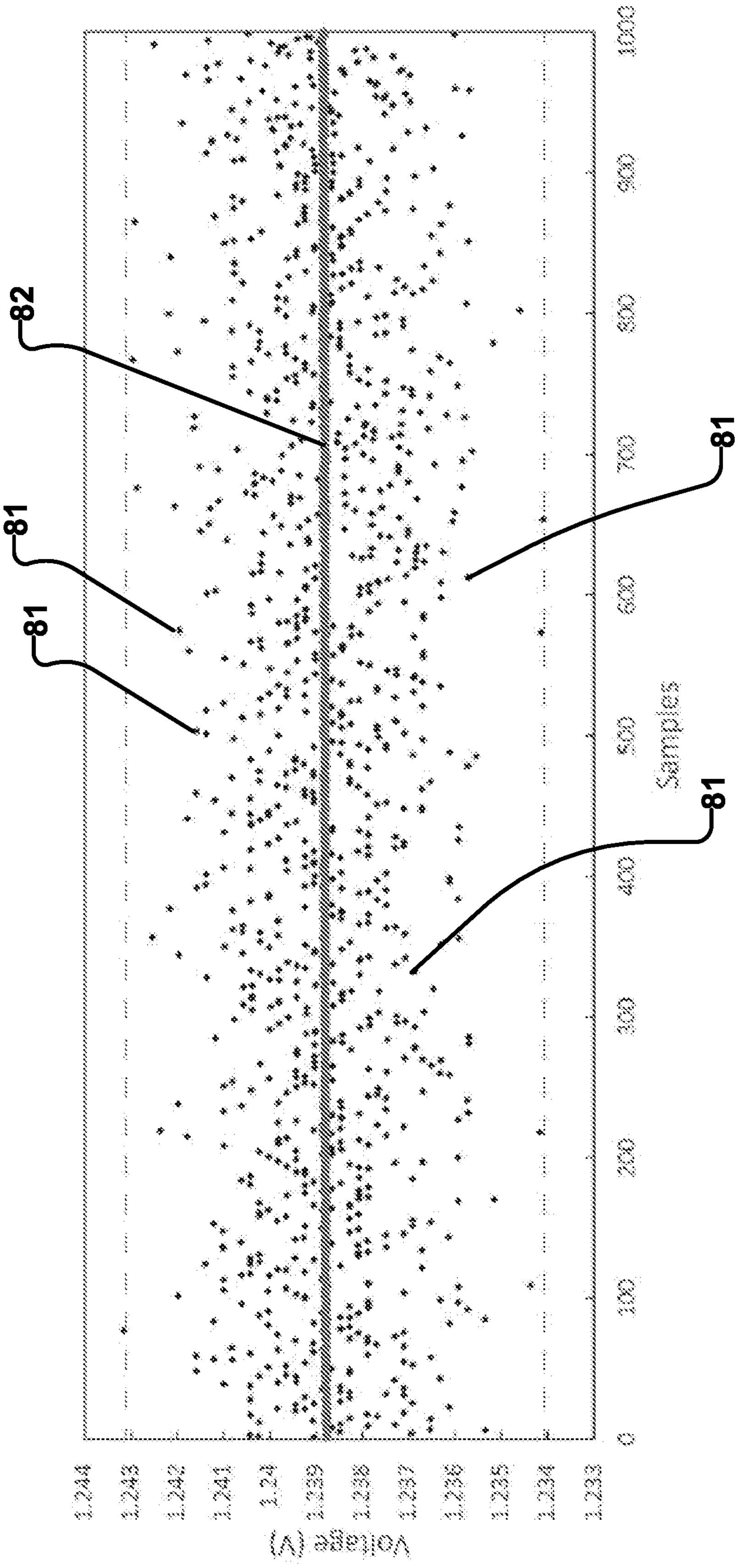
FIGS. 7 and 8 are graphical illustrations representing example data.

FIG. 7 is a graphical illustration of example data from measuring the voltage of an AA battery with a 20-bit ΔΣ ADC having a conversion period of 540 μs and an output averaging of 1 compared to measurements taken with the systems and methods described herein. Using the 20-bit ΔΣ ADC alone the peak-to-peak noise is about 8.98 mV (see e.g. data points 81). Using the systems and methods described herein the peak-to-peak noise is about 142 μV (see e.g. data points 82).

Figure 8:
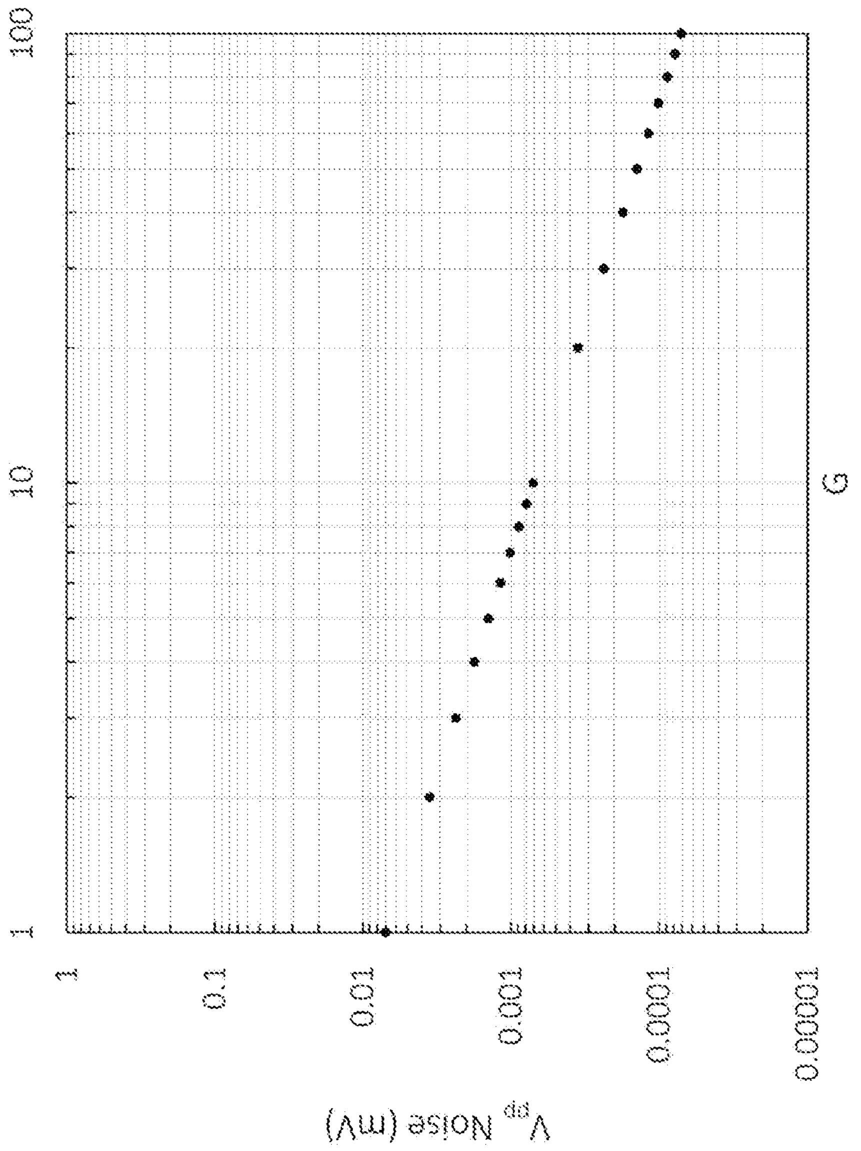

FIG. 8 is a graphical illustration of peak-to-peak noise that is measured relative to the gain of difference circuit 15.

In some embodiments ADC 53 and ADC 56 comprise an ADC which can be configured to measure both positive and negative voltages (e.g. a bi-polar ADC). In some embodiments ADC 53 and ADC 56 are configured to measure negative voltages.

If ADCs 53 and 56 cannot measure negative voltages but at least a portion of $V_{in}$ to be measured comprises a negative voltage, circuit 50 may comprise a circuit 90 configured to convert the negative voltages into positive voltages which can be measured by ADCs 53 and 56.

Figure 9A:
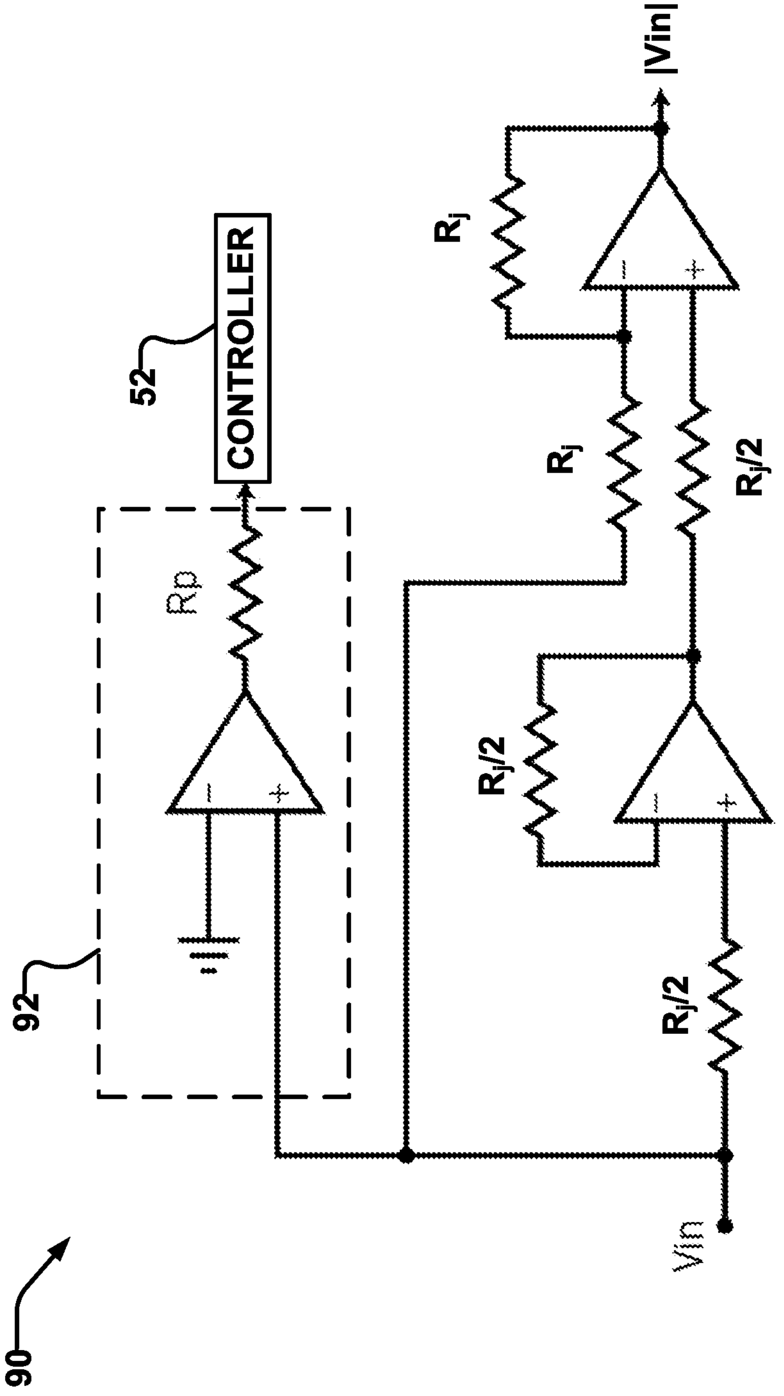
FIG. 9A is a schematic diagram of an example circuit.

In some embodiments circuit 90 comprises a circuit which receives as input $V_{in}$ and outputs the absolute value of $V_{in}$ (i.e. outputs the non-negative magnitude of $V_{in}$ without regard to its polarity). The absolute value of $V_{in}$ may then be input into ADC 53 and difference circuit 55. FIG. 9A is a schematic diagram which illustrates an example embodiment of circuit 90 which outputs the absolute value of $V_{in}$.

Figure 9B:
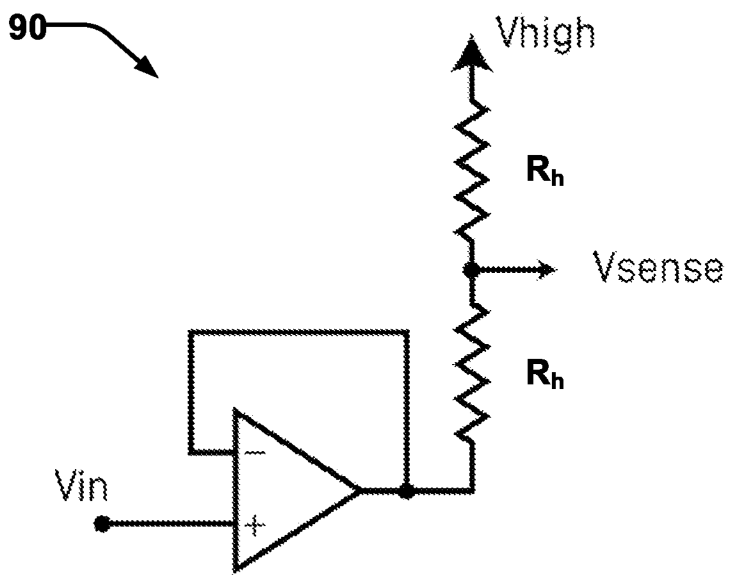
FIG. 9B is a schematic diagram of an example circuit.

In some embodiments circuit 90 comprises an amplifier and voltage divider. An example of such circuit 90 is shown in FIG. 9B. Output voltage $V_{sense}$ may be provided as input to ADC 53 and difference circuit 55. $V_{high}$ comprises a positive voltage that is equal to or greater than the amplitude of the most negative expected value of $V_{in}$. For example, if the most negative possible value of $V_{in}$ is −36V then $V_{high}$ may be set to +36V. In such cases, $V_{sense}$ has a value that is within a range of positive voltages (in this example 0 to 36 volts). Values of $V_{sense}$ that are above a midpoint of the range (e.g. just over 18 volts to 36 volts in this example) correspond to positive values of $V_{in}$, voltages of $V_{sense}$ that are below the midpoint of the range (e.g. 0 to just below 18 volts in this example) correspond to negative values of $V_{in}$ and a value of $V_{sense}$ that is at the midpoint of the range (e.g. 18 volts in this example) corresponds to $V_{in}$=0V. Polarity may be added to the final measurement by controller 52. Advantageously the relationship between the negative input voltage $V_{in}$ and the converted positive voltage $V_{sense}$ may be a linear relationship.

Circuit 90 may optionally comprise a circuit 92 which determines whether a portion of $V_{in}$ is negative (see e.g. FIG. 6A). An output of circuit 92 may be input into controller 52. In some embodiments the output of circuit 92 may be used by controller 52 to raise, for example, a flag which indicates that $V_{in}$ is negative. Based on the raised flag the proper polarity may be added to the outputs of ADCs 53 and/or 56. In some embodiments circuit 50 comprises a switch (e.g. a relay, multiplexer, etc.) which may be used to switch an input of ADC 53 and difference circuit 55 from $V_{in}$ to an output of circuit 90 (e.g. if $V_{in}$ is negative) or vice versa (e.g. if $V_{in}$ is positive). Such switch may be controlled by controller 52. In some embodiments controller 52 controls such switch based on an output of circuit 92. Resistor $R_p$ may not be necessary in all cases.

In some embodiments an output of circuit 90 is continuously input into ADC 53 and difference circuit 55.

In some embodiments the systems and/or methods described herein are configured to measure electrical currents with high precision. For example, the systems and methods described herein may be used to measure a voltage drop across a resistor (or other electrical components) having a known resistance or impedance. Current may be determined based on the measured voltage drop and known resistance or impedance.

Figure 10:
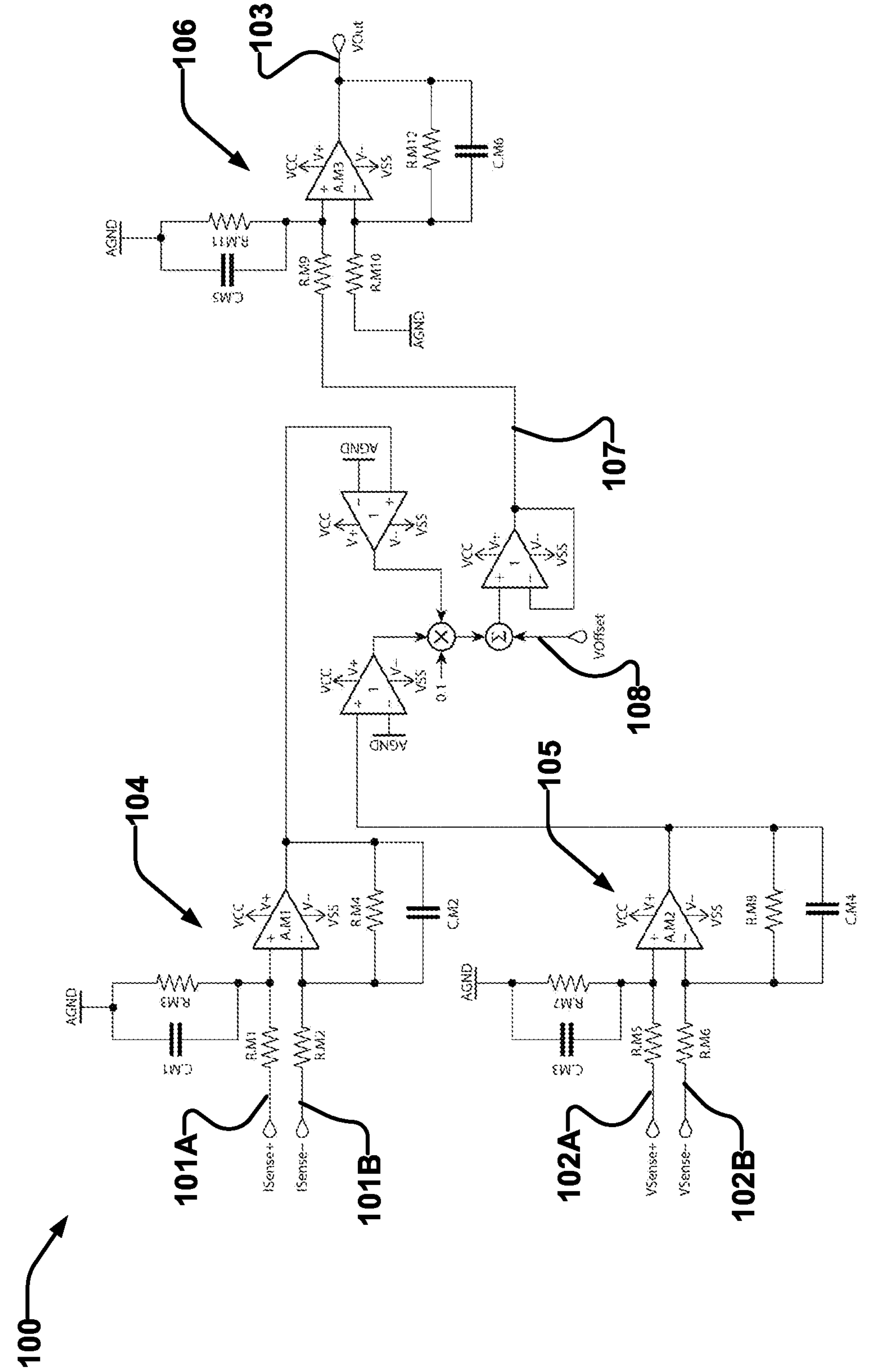
FIG. 10 is an electrical schematic diagram of an example circuit.

Another aspect of the technology described herein provides an example circuit for measuring electrical power applied to a load (e.g. load 12). In some embodiments electrical power applied to a load may be measured with a multiplier circuit such as example circuit 100 shown in FIG. 10.

Circuit 100 receives as input signals 101A and 101B corresponding to positive and negative polarities respectively of a measured current passing through load 12 and input signals 102A and 102B corresponding to positive and negative polarities respectively of a measured voltage (e.g. directly measured, measured via a voltage follower, etc.) across load 12. In some embodiments one or both of negative polarity signals 101B and 102B are electrically grounded. In some embodiments one or both of positive polarity signals 101A and 102A are electrically grounded.

Circuit 100 multiples the input current signal by the input voltage signal to generate an output measured power signal 103. Measured power signal 103 represents a measure of the electrical power being applied to load 12.

The current and voltage signals may be amplified or attenuated by amplifier subcircuits 104 and 105 respectively. Amplifier subcircuit 106 may vary the multiplication product signal (e.g. signal 107) for the output measured power signal 103 to match actual power applied to load 12 with a high level of accuracy (e.g. accuracy within a range from about ±0.0001 W to about ±0.01 W).

Optionally, circuit 100 may receive as input an offset voltage signal 108. Offset voltage signal 108 may be included to at least partially remove an offset voltage introduced by one or more components of circuit 100.

Another aspect of the technology described herein provides example circuits for applying or providing constant electrical power to a load (e.g. load 12).

Figure 11A:
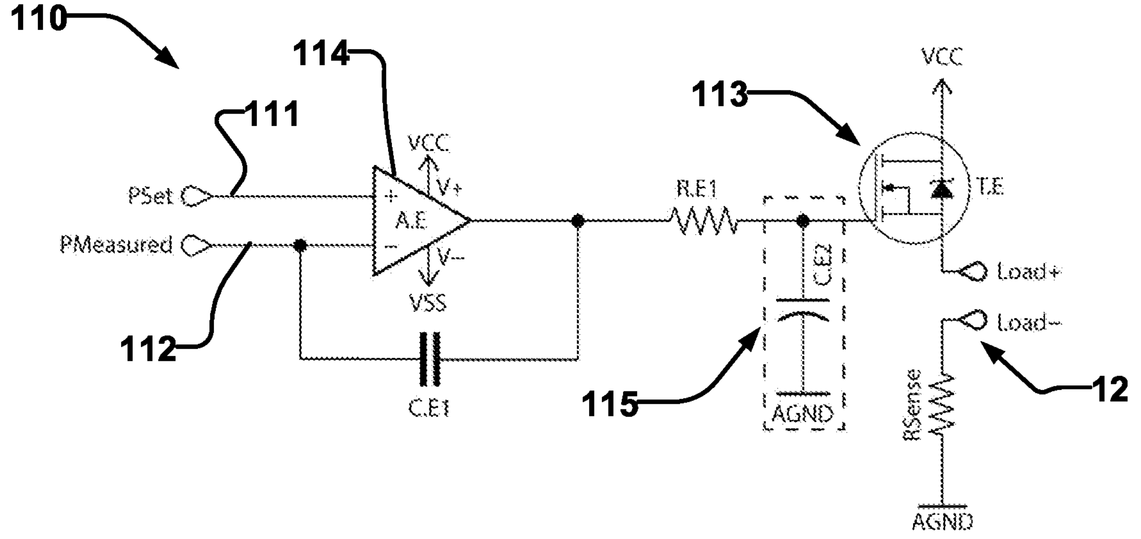
FIG. 11A is an electrical schematic diagram of an example circuit.

FIG. 11A illustrates an example circuit 110 for providing constant power to load 12. Circuit 110 comprises an error amplifier circuit. Circuit 110 receives as input signal 111 representing a desired or set or target value of power to be applied to load 12 and signal 112 representing measured power being applied to load 12. In some embodiments signal 112 corresponds to output measured power signal 103 from circuit 100 described elsewhere herein. Input signal 111 may, for example, originate from controller 15. An N-Channel MOSFET 113 may, for example, vary current being applied to load 12. Noise at the output stage of amplifier 114 of circuit 110 may at least partially be filtered. For example, circuit 110 may optionally comprise capacitor 115 to at least partially filter noise present at the output stage.

Figure 11B:
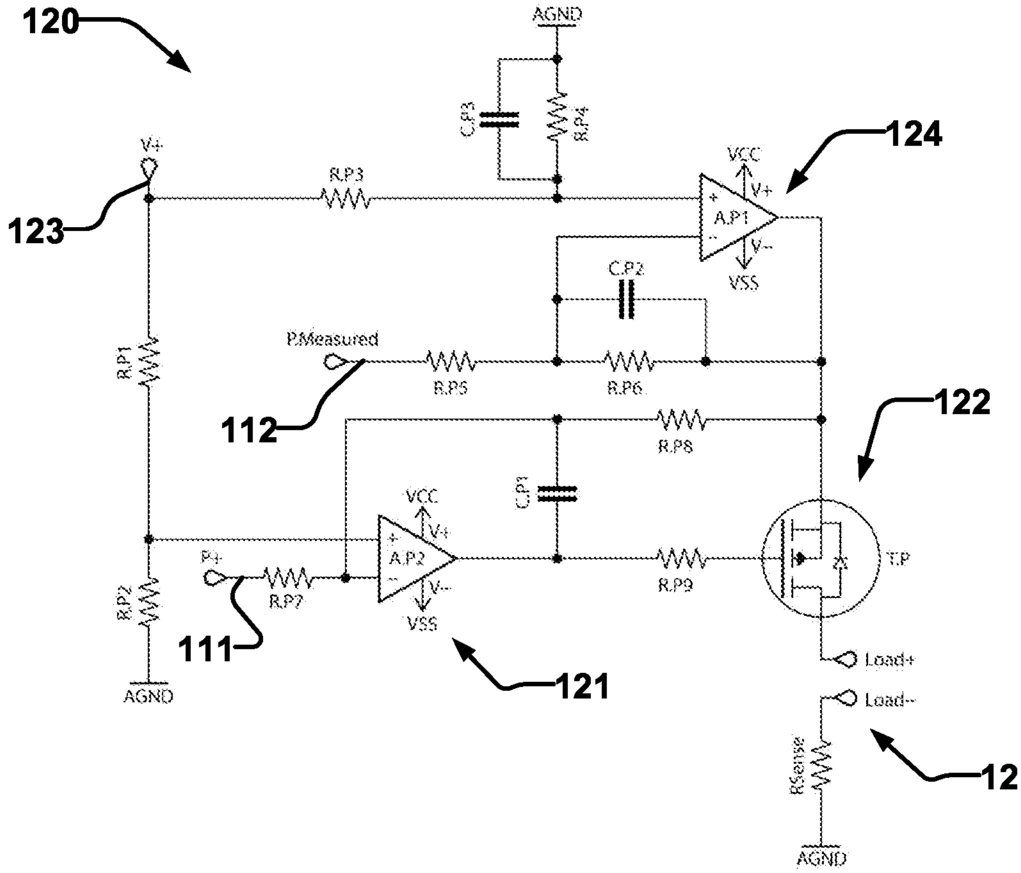
FIG. 11B is an electrical schematic diagram of an example circuit.

As another example, FIG. 11B illustrates an example circuit 120 for providing constant power to load 12. Circuit 120 comprises an amplifier subcircuit 121 which keeps power applied to load 12 constant at a desired value set by input signal 111. Amplifier subcircuit 121 may control current passing though load 12 to keep power applied to load 12 constant at the desired value. A P-Channel MOSFET 122 may, for example, vary current being applied to load 12. Input signal 123 corresponds to a voltage value (e.g. a voltage signal supplied by a power source component). Input signal 123 may be constant. Input signal 123 may be the same or different than VCC. In some embodiments input signal 123 is less than VCC. In some embodiments input signal 123 is higher than VCC.

Amplifier subcircuit 124 comprises a differential amplifier configured to determine a difference between input signals 123 and 112. Amplifier subcircuit 124 may be replaced with another electrical component or circuit configured to determine the difference between input signals 123 and 112. The difference between input signals 123 and 112 may then, for example, still be supplied to P-Channel MOSFET 122 (or other desired component).

Figure 11C:
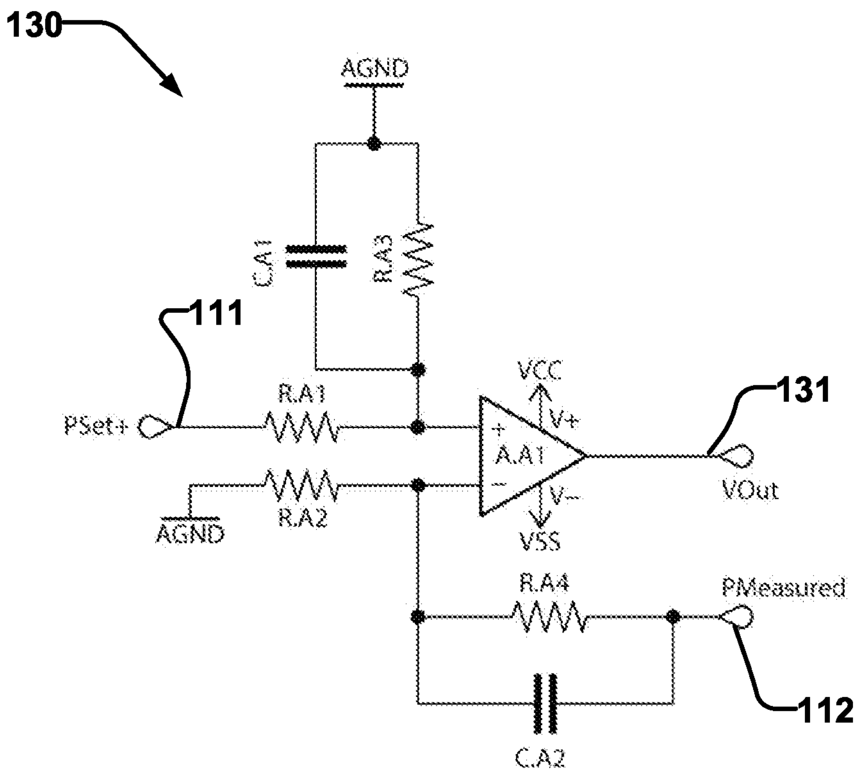
FIG. 11C is an electrical schematic diagram of an example circuit.

As another example, FIG. 11C illustrates an example circuit 130 for providing constant power to load 12. Circuit 130 provides constant power by controlling voltage applied across load 12. Output voltage signal 131 may, for example, be applied to an input (e.g. a positive polarity input (e.g. VL+)) of load 12.

It is emphasized that any aspect and/or feature of the technology described herein may be a standalone aspect and/or feature (e.g. used individually). Additionally, or alternatively, two or more aspects and/or features may be combined together.

The technology described herein may be used to control power (e.g. to provide constant power) in one or both of the analog and digital domains. For example, an analog circuit may provide constant power while a desired power level (e.g. signal 111) may be digitally set and/or controlled (e.g. via feedback control).

Where a component (e.g. a software module, processor, assembly, device, circuit, etc.) is referred to herein, unless otherwise indicated, reference to that component (including a reference to a "means") should be interpreted as including as equivalents of that component any component which performs the function of the described component (i.e., that is functionally equivalent), including components which are not structurally equivalent to the disclosed structure which performs the function in the illustrated exemplary embodiments of the invention.

Embodiments of the invention may be implemented using specifically designed hardware, configurable hardware, programmable data processors configured by the provision of software (which may optionally comprise "firmware") capable of executing on the data processors, special purpose computers or data processors that are specifically programmed, configured, or constructed to perform one or more steps in a method as explained in detail herein and/or combinations of two or more of these. Examples of specifically designed hardware are: logic circuits, application-specific integrated circuits ("ASICs"), large scale integrated circuits ("LSIs"), very large scale integrated circuits ("VLSIs"), and the like. Examples of configurable hardware are: one or more programmable logic devices such as programmable array logic ("PALs"), programmable logic arrays ("PLAs"), and field programmable gate arrays ("FPGAs"). Examples of programmable data processors are: microprocessors, digital signal processors ("DSPs"), embedded processors, graphics processors, math co-processors, general purpose computers, server computers, cloud computers, mainframe computers, computer workstations, and the like. For example, one or more data processors in a control circuit for a device may implement methods as described herein by executing software instructions in a program memory accessible to the processors.

Processing may be centralized or distributed. Where processing is distributed, information including software and/or data may be kept centrally or distributed. Such information may be exchanged between different functional units by way of a communications network, such as a Local Area Network (LAN), Wide Area Network (WAN), or the Internet, wired or wireless data links, electromagnetic signals, or other data communication channel.

In some embodiments, the invention may be partially implemented in software. For greater clarity, "software" includes any instructions executed on a processor, and may include (but is not limited to) firmware, resident software, microcode, code for configuring a configurable logic circuit, applications, apps, and the like. Both processing hardware and software may be centralized or distributed (or a combination thereof), in whole or in part, as known to those skilled in the art. For example, software and other modules may be accessible via local memory, via a network, via a browser or other application in a distributed computing context, or via other means suitable for the purposes described above.

Software and other modules may reside on servers, workstations, personal computers, tablet computers, and other devices suitable for the purposes described herein.

Interpretation of Terms

Unless the context clearly requires otherwise, throughout the description and the claims:

- "comprise", "comprising", and the like are to be construed in an inclusive sense, as opposed to an exclusive or exhaustive sense; that is to say, in the sense of "including, but not limited to";
- "connected", "coupled", or any variant thereof, means any connection or coupling, either direct or indirect, between two or more elements; the coupling or connection between the elements can be physical, logical, or a combination thereof;
- "herein", "above", "below", and words of similar import, when used to describe this specification, shall refer to this specification as a whole, and not to any particular portions of this specification;
- "or", in reference to a list of two or more items, covers all of the following interpretations of the word: any of the items in the list, all of the items in the list, and any combination of the items in the list;
- the singular forms "a", "an", and "the" also include the meaning of any appropriate plural forms. These terms ("a", "an", and "the") mean one or more unless stated otherwise;
- "and/or" is used to indicate one or both stated cases may occur, for example A and/or B includes both (A and B) and (A or B);
- "approximately" when applied to a numerical value means the numerical value ±10%;

where a feature is described as being "optional" or "optionally" present or described as being present "in some embodiments" it is intended that the present disclosure encompasses embodiments where that feature is present and other embodiments where that feature is not necessarily present and other embodiments where that feature is excluded. Further, where any combination of features is described in this application this statement is intended to serve as antecedent basis for the use of exclusive terminology such as "solely," "only" and the like in relation to the combination of features as well as the use of "negative" limitation(s)" to exclude the presence of other features; and "first" and "second" are used for descriptive purposes and cannot be understood as indicating or implying relative importance or indicating the number of indicated technical features.

Words that indicate directions such as "vertical", "transverse", "horizontal", "upward", "downward", "forward", "backward", "inward", "outward", "left", "right", "front", "back", "top", "bottom", "below", "above", "under", and the like, used in this description and any accompanying claims (where present), depend on the specific orientation of the apparatus described and illustrated. The subject matter described herein may assume various alternative orientations. Accordingly, these directional terms are not strictly defined and should not be interpreted narrowly.

Embodiments of the invention may be implemented using specifically designed hardware, configurable hardware, programmable data processors configured by the provision of software (which may optionally comprise "firmware") capable of executing on the data processors, special purpose computers or data processors that are specifically programmed, configured, or constructed to perform one or more steps in a method as explained in detail herein and/or combinations of two or more of these. Examples of specifically designed hardware are: logic circuits, application-specific integrated circuits ("ASICs"), large scale integrated circuits ("LSIs"), very large scale integrated circuits ("VLSIs"), and the like. Examples of configurable hardware are: one or more programmable logic devices such as programmable array logic ("PALs"), programmable logic arrays ("PLAs"), and field programmable gate arrays ("FPGAs"). Examples of programmable data processors are: microprocessors, digital signal processors ("DSPs"), embedded processors, graphics processors, math co-processors, general purpose computers, server computers, cloud computers, mainframe computers, computer workstations, and the like. For example, one or more data processors in a control circuit for a device may implement methods as described herein by executing software instructions in a program memory accessible to the processors.

Processing may be centralized or distributed. Where processing is distributed, information including software and/or data may be kept centrally or distributed. Such information may be exchanged between different functional units by way of a communications network, such as a Local Area Network (LAN), Wide Area Network (WAN), or the Internet, wired or wireless data links, electromagnetic signals, or other data communication channel.

For example, while processes or blocks are presented in a given order, alternative examples may perform routines having steps, or employ systems having blocks, in a different order, and some processes or blocks may be deleted, moved, added, subdivided, combined, and/or modified to provide alternative or subcombinations. Each of these processes or blocks may be implemented in a variety of different ways. Also, while processes or blocks are at times shown as being performed in series, these processes or blocks may instead be performed in parallel, or may be performed at different times.

In addition, while elements are at times shown as being performed sequentially, they may instead be performed simultaneously or in different sequences. It is therefore intended that the following claims are interpreted to include all such variations as are within their intended scope.

In some embodiments, the invention at least partially may be implemented in software. For greater clarity, "software" includes any instructions executed on a processor, and may include (but is not limited to) firmware, resident software, microcode, and the like. Both processing hardware and software may be centralized or distributed (or a combination thereof), in whole or in part, as known to those skilled in the art. For example, software and other modules may be accessible via local memory, via a network, via a browser or other application in a distributed computing context, or via other means suitable for the purposes described above.

Where a component (e.g. a software module, processor, assembly, device, circuit, etc.) is referred to above, unless otherwise indicated, reference to that component (including a reference to a "means") should be interpreted as including as equivalents of that component any component which performs the function of the described component (i.e., that is functionally equivalent), including components which are not structurally equivalent to the disclosed structure which performs the function in the illustrated exemplary embodiments of the invention.

Specific examples of systems, methods and apparatus have been described herein for purposes of illustration. These are only examples. The technology provided herein can be applied to systems other than the example systems described above. Many alterations, modifications, additions, omissions, and permutations are possible within the practice of this invention. This invention includes variations on described embodiments that would be apparent to the skilled addressee, including variations obtained by: replacing features, elements and/or acts with equivalent features, elements and/or acts; mixing and matching of features, elements and/or acts from different embodiments; combining features, elements and/or acts from embodiments as described herein with features, elements and/or acts of other technology; and/or omitting combining features, elements and/or acts from described embodiments.

Various features are described herein as being present in "some embodiments". Such features are not mandatory and may not be present in all embodiments. Embodiments of the invention may include zero, any one or any combination of two or more of such features. This is limited only to the extent that certain ones of such features are incompatible with other ones of such features in the sense that it would be impossible for a person of ordinary skill in the art to construct a practical embodiment that combines such incompatible features. Consequently, the description that "some embodiments" possess feature A and "some embodiments" possess feature B should be interpreted as an express indication that the inventors also contemplate embodiments which combine features A and B (unless the description states otherwise or features A and B are fundamentally incompatible).

Where a range for a value is stated, the stated range includes all sub-ranges of the range. It is intended that the statement of a range supports the value being at an endpoint of the range as well as at any intervening value to the tenth of the unit of the lower limit of the range, as well as any subrange or sets of sub ranges of the range unless the context clearly dictates otherwise or any portion(s) of the stated range is specifically excluded. Where the stated range includes one or both endpoints of the range, ranges excluding either or both of those included endpoints are also included in the invention.

Certain numerical values described herein are preceded by "about". In this context, "about" provides literal support for the exact numerical value that it precedes, the exact numerical value ±5%, as well as all other numerical values that are near to or approximately equal to that numerical value. Unless otherwise indicated a particular numerical value is included in "about" a specifically recited numerical value where the particular numerical value provides the substantial equivalent of the specifically recited numerical value in the context in which the specifically recited numerical value is presented. For example, a statement that something has the numerical value of "about 10" is to be interpreted as: the set of statements:

- in some embodiments the numerical value is 10;
- in some embodiments the numerical value is in the range of 9.5 to 10.5;

and if from the context the person of ordinary skill in the art would understand that values within a certain range are substantially equivalent to 10 because the values with the range would be understood to provide substantially the same result as the value 10 then "about 10" also includes:

- in some embodiments the numerical value is in the range of C to D where C and D are respectively lower and upper endpoints of the range that encompasses all of those values that provide a substantial equivalent to the value 10.

Specific examples of systems, methods and apparatus have been described herein for purposes of illustration. These are only examples. The technology provided herein can be applied to systems other than the example systems described above. Many alterations, modifications, additions, omissions, and permutations are possible within the practice of this invention. This invention includes variations on described embodiments that would be apparent to the skilled addressee, including variations obtained by: replacing features, elements and/or acts with equivalent features, elements and/or acts; mixing and matching of features, elements and/or acts from different embodiments; combining features, elements and/or acts from embodiments as described herein with features, elements and/or acts of other technology; and/or omitting combining features, elements and/or acts from described embodiments.

As will be apparent to those of skill in the art upon reading this disclosure, each of the individual embodiments described and illustrated herein has discrete components and features which may be readily separated from or combined with the features of any other described embodiment(s) without departing from the scope of the present invention.

Any aspects described above in reference to apparatus may also apply to methods and vice versa.

Any recited method can be carried out in the order of events recited or in any other order which is logically possible. For example, while processes or blocks are presented in a given order, alternative examples may perform routines having steps, or employ systems having blocks, in a different order, and some processes or blocks may be deleted, moved, added, subdivided, combined, and/or modified to provide alternative or subcombinations. Each of these processes or blocks may be implemented in a variety of different ways. Also, while processes or blocks are at times shown as being performed in series, these processes or blocks may instead be performed in parallel, simultaneously or at different times.

Various features are described herein as being present in "some embodiments". Such features are not mandatory and may not be present in all embodiments. Embodiments of the invention may include zero, any one or any combination of two or more of such features. All possible combinations of such features are contemplated by this disclosure even where such features are shown in different drawings and/or described in different sections or paragraphs. This is limited only to the extent that certain ones of such features are incompatible with other ones of such features in the sense that it would be impossible for a person of ordinary skill in the art to construct a practical embodiment that combines such incompatible features. Consequently, the description that "some embodiments" possess feature A and "some embodiments" possess feature B should be interpreted as an express indication that the inventors also contemplate embodiments which combine features A and B (unless the description states otherwise or features A and B are fundamentally incompatible). This is the case even if features A and B are illustrated in different drawings and/or mentioned in different paragraphs, sections or sentences.

The invention comprises a number of non-limiting aspects. Non-limiting aspects of the invention comprise:

1. A power supply system comprising:
   - a loading circuit comprising power electronics configured to apply DC electrical power to a load;
   - a power supply unit coupled to drive the loading circuit, the power supply unit comprising a converter configured to convert input AC electrical power to DC electrical power; and
   - a controller configured to:
     - generate a voltage control signal and a current control signal to be received as input by the loading circuit, the voltage control signal and current control signal representing voltage and current values respectively to be applied to the load;
     - determine a voltage level to be supplied by the power supply unit to the loading circuit; and
     - provide a power supply voltage control signal to the power supply unit, the power supply voltage control signal representing the voltage level to be supplied by the power supply unit to the loading circuit.
2. The system of aspect 1 or any other aspect herein wherein the voltage level to be supplied by the power supply unit to the loading circuit is greater than the voltage to be applied across the load by a minimum threshold amount.
3. The system of aspect 2 or any other aspect herein wherein the minimum threshold amount is at least 0.8V.
4. The system of any one of aspects 1 to 3 or any other aspect herein comprising one or both of a voltage sensor configured to measure a voltage drop across the load and a current sensor configured to measure current passing through the load, the voltage control signal and the current control signal at least partially based on the measured voltage and/or current.
5. The system of any one of aspects 1 to 4 or any other aspect herein wherein the power electronics comprise a plurality of amplifiers, the plurality of amplifiers comprising at least a first amplifier and a second amplifier, the second amplifier having a greater maximum output current than the first amplifier.

6. The system of aspect 5 or any other aspect herein comprising:
   a first relay operable to couple an output of the first amplifier to the load; and
   a second relay operable to couple an output of the second amplifier to the load;
   wherein the controller is configured to activate one or both of the first relay and the second relay based on a maximum current that is to pass through the load, the maximum current being less than the maximum output current of the amplifier corresponding to the activated relay.
7. The system of any one of aspects 1 to 6 or any other aspect herein wherein the voltage control signals and current control signals are determined at least in part based on open loop control of a performance parameter of the load.
8. The system of aspect 7 or any other aspect herein wherein the performance parameter of the load comprises one of temperature, light intensity, strain and stress.
9. The system of aspect 7 or 8 or any other aspect herein wherein the load comprises a dynamically varying load.
10. The system of any one of aspects 1 to 9 or any other aspect herein further comprising a trained machine learning model, the machine learning model trained to optimize the voltage control signal and/or the current control signal based in part on power dissipation characteristics of the load.
11. The system of aspect 10 or any other aspect herein wherein the trained machine learning model comprises a neural network.
12. The system of any one of aspects 1 to 11 or any other aspect herein wherein the loading circuit is configurable to apply power in the range from about 1 μW to about 1 MW.
13. The system of any one of aspects 1 to 12 or any other aspect herein wherein the loading circuit has an output voltage controllable in the range of 0V to about 36V.
14. The system of any one of aspects 1 to 13 or any other aspect herein wherein the loading circuit has an output current controllable in the range of 0 A to about 16 A.
15. The system of any one of aspects 1 to 14 or any other aspect herein wherein the controller is configurable to control the loading circuit to provide constant power, constant current and/or constant voltage.
16. The system of any one of aspects 1 to 15 or any other aspect herein comprising a circuit for measuring analog voltages, the circuit comprising:
   at least a first analog-to-digital converter, the first analog-to-digital converter configured to receive an input analog voltage signal;
   a baseline reference circuit, the baseline reference circuit configured to generate a baseline voltage, the baseline reference circuit configurable by the controller; and
   a difference circuit, the difference circuit configured to subtract the baseline voltage from the input analog voltage signal.
17. The system of aspect 16 or any other aspect herein wherein to configure the baseline reference circuit the controller is configured to:
   divide the input analog voltage by a step size of the first analog-to-digital converter;
   round the result of the division down to a nearest integer value; and
   multiply the nearest integer value by the step size of the first analog-to-digital converter.
18. The system of aspect 16 or 17 or any other aspect herein wherein the baseline reference circuit comprises a programmable voltage source.
19. The system of any one of aspects 16 to 18 or any other aspect herein wherein the baseline reference circuit receives as input a bias voltage signal, the bias voltage signal combinable with the baseline voltage to mitigate an offset voltage or bias voltage introduced by one or more components of the baseline reference circuit.
20. The system of any one of aspects 16 to 19 or any other aspect herein wherein one or both of the baseline reference circuit and the controller are configured to compensate for voltage drifts of one or more components of the baseline reference circuit.
21. The system of aspect 20 or any other aspect herein wherein the voltage drifts are caused by a change of temperature of the one or more components of the baseline reference circuit.
22. The system of aspect 20 or 21 or any other aspect herein wherein the baseline reference circuit comprises an analog circuit configured to compensate for the voltage drifts.
23. The system of any one of aspects 16 to 22 or any other aspect herein wherein the baseline reference circuit comprises one or more filters configured to at least partially suppress noise or other artifacts from the baseline voltage.
24. The system of any one of aspects 16 to 23 or any other aspect herein wherein the difference circuit is configured to amplify a difference between the input analog voltage signal and the baseline voltage.
25. The system of any one of aspects 16 to 24 or any other aspect herein wherein the difference circuit comprises a differential amplifier.
26. The system of any one of aspects 16 to 25 or any other aspect herein wherein the circuit for measuring analog voltages comprises a second analog-to-digital converter configured to receive an analog output from the difference circuit and to convert the analog output into corresponding digital values and wherein the controller is configured to receive the digital values from the second analog-to-digital converter.
27. The system of aspect 26 or any other aspect herein or any other aspect herein wherein the controller is configured to:
   divide the received digital values from the second analog-to-digital converter by a gain of the difference circuit to determine a value of a least significant bit;
   replace the values of a least significant bit of the input analog voltage signal with the determined value of the least significant bit.
28. The system of aspect 26 or 27 or any other aspect herein wherein the first and second analog-to-digital converters are operated concurrently.
29. The system of any one of aspects 26 to 28 or any other aspect herein wherein the first and second analog-to-digital converters each comprise a delta-sigma (ΔΣ) analog-to-digital converter.
30. The system of any one of aspects 16 to 25 or any other aspect herein wherein the first analog-to-digital converter is configured to receive an analog output from the difference circuit and to convert the analog output into corresponding digital values and wherein the controller is configured to receive the digital values from the first analog-to-digital converter.

31. The system of aspect 30 or any other aspect herein comprising a multiplexer controllable to select whether the first analog-to-digital converter receives as input the input analog voltage signal or the analog output from the difference circuit.

32. The system of any one of aspects 16 to 31 or any other aspect herein wherein the controller is configured to verify whether one or both of the baseline reference circuit and the difference circuit are properly configured.

33. The system of any one of aspects 16 to 32 or any other aspect herein comprising a different power source for at least one analog component than a power source for at least one digital component.

34. A method for controlling a parameter of a load, the method comprising:
determining a relationship between the parameter of the load and power dissipated by the load; and
delivering electrical power to the load and based on the determined relationship controlling the power applied to the load to maintain the parameter of the load within a desired range.

35. The method of aspect 34 or any other aspect herein wherein determining the relationship between the parameter of the load and power dissipated by the load comprises applying a time varying calibration signal to the load and measuring a change in the parameter as the calibration signal is applied.

36. The method of aspect 35 or any other aspect herein wherein the calibration signal comprises a time varying voltage signal.

37. The method of aspect 36 or any other aspect herein wherein the calibration signal comprises a voltage ramp signal.

38. The method of any one of aspects 34 to 37 or any other aspect herein wherein power is applied to the load with the system according to any one of aspects 1 to 33.

39. A system for measuring analog voltages, the system comprising:
a controller;
at least a first analog-to-digital converter, the first analog-to-digital converter configured to receive an input analog voltage signal;
a baseline reference circuit, the baseline reference circuit configured to generate a baseline voltage, the baseline reference circuit configurable by the controller; and
a difference circuit, the difference circuit configured to subtract the baseline voltage from the input analog voltage signal.

40. The system of aspect 39 or any other aspect herein wherein to configure the baseline reference circuit the controller is configured to:
divide the input analog voltage by a step size of the first analog-to-digital converter;
round the result of the division down to a nearest integer value; and
multiply the nearest integer value by the step size of the first analog-to-digital converter.

41. The system of aspect 39 or 40 or any other aspect herein wherein the baseline reference circuit comprises a programmable voltage source.

42. The system of any one of aspects 39 to 41 or any other aspect herein wherein the baseline reference circuit receives as input a bias voltage signal, the bias voltage signal combinable with the baseline voltage to mitigate an offset voltage or bias voltage introduced by one or more components of the baseline reference circuit.

43. The system of any one of aspects 39 to 42 or any other aspect herein wherein one or both of the baseline reference circuit and the controller are configured to compensate for voltage drifts of one or more components of the baseline reference circuit.

44. The system of aspect 43 or any other aspect herein wherein the voltage drifts are caused by a change of temperature of the one or more components of the baseline reference circuit.

45. The system of aspect 43 or 44 or any other aspect herein wherein the baseline reference circuit comprises an analog circuit configured to compensate for the voltage drifts.

46. The system of any one of aspects 39 to 45 or any other aspect herein wherein the baseline reference circuit comprises one or more filters configured to at least partially suppress noise or other artifacts from the baseline voltage.

47. The system of any one of aspects 39 to 46 or any other aspect herein wherein the difference circuit is configured to amplify a difference between the input analog voltage signal and the baseline voltage.

48. The system of any one of aspects 39 to 47 or any other aspect herein wherein the difference circuit comprises a differential amplifier.

49. The system of any one of aspects 39 to 48 or any other aspect herein comprising a second analog-to-digital converter configured to receive an analog output from the difference circuit and to convert the analog output into corresponding digital values and wherein the controller is configured to receive the digital values from the second analog-to-digital converter.

50. The system of aspect 49 or any other aspect herein wherein the controller is configured to:
divide the received digital values from the second analog-to-digital converter by a gain of the difference circuit to determine a value of a least significant bit;
replace the values of a least significant bit of the input analog voltage signal with the determined value of the least significant bit.

51. The system of aspect 49 or 50 or any other aspect herein wherein the first and second analog-to-digital converters are operated concurrently.

52. The system of any one of aspects 49 to 51 or any other aspect herein wherein the first and second analog-to-digital converters each comprise a delta-sigma ($\Delta\Sigma$) analog-to-digital converter.

53. The system of any one of aspects 39 to 48 or any other aspect herein wherein the first analog-to-digital converter is configured to receive an analog output from the difference circuit and to convert the analog output into corresponding digital values and wherein the controller is configured to receive the digital values from the first analog-to-digital converter.

54. The system of aspect 53 or any other aspect herein comprising a multiplexer controllable to select whether the first analog-to-digital converter receives as input the input analog voltage signal or the analog output from the difference circuit.

55. The system of any one of aspects 39 to 54 or any other aspect herein wherein the controller is configured to verify whether one or both of the baseline reference circuit and the difference circuit are properly configured.

56. The system of any one of aspects 39 to 55 or any other aspect herein comprising a different power source for at least one analog component than a power source for at least one digital component.

57. Apparatus having any new and inventive feature, combination of features, or sub-combination of features as described herein.

58. Methods having any new and inventive steps, acts, combination of steps and/or acts or sub-combination of steps and/or acts as described herein.

It is therefore intended that the following appended claims and claims hereafter introduced are interpreted to include all such modifications, permutations, additions, omissions, and sub-combinations as may reasonably be inferred. The scope of the claims should not be limited by the preferred embodiments set forth in the examples, but should be given the broadest interpretation consistent with the description as a whole.

What is claimed is:

1. A power supply system comprising:

a loading circuit comprising power electronics configured to, at least, apply DC electrical power to a load, the power electronics comprising a plurality of amplifiers, the plurality of amplifiers comprising at least a first amplifier and a second amplifier, the second amplifier having a greater maximum output current than the first amplifier;

a power supply unit coupled to drive the loading circuit, the power supply unit comprising a converter configured to, at least, convert input AC electrical power to DC electrical power; and a controller configured to at least:

generate a voltage control signal and a current control signal to be received as input by the loading circuit, the voltage control signal and current control signal representing voltage and current values respectively to be applied to the load, determine a voltage level to be supplied by the power supply unit to the loading circuit, and provide a power supply voltage control signal to the power supply unit, the power supply voltage control signal representing the voltage level to be supplied by the power supply unit to the loading circuit;

a first relay operable to, at least, couple an output of the first amplifier to the load; and a second relay operable to, at least, couple an output of the second amplifier to the load;

wherein the controller is configured to, at least, activate the first relay, the second relay or both based on a maximum current that is to pass through the load, the maximum current being less than the maximum output current of the amplifier corresponding to the activated relay.

2. A power supply system comprising:

a loading circuit comprising power electronics configured to, at least, apply DC electrical power to a load;

a power supply unit coupled to drive the loading circuit, the power supply unit comprising a converter configured to, at least, convert input AC electrical power to DC electrical power;

a controller configured to at least:

generate a voltage control signal and a current control signal to be received as input by the loading circuit, the voltage control signal and current control signal representing voltage and current values respectively to be applied to the load, determine a voltage level to be supplied by the power supply unit to the loading circuit, and provide a power supply voltage control signal to the power supply unit, the power supply voltage control signal representing the voltage level to be supplied by the power supply unit to the loading circuit;

at least a first analog-to-digital converter, the first analog-to-digital converter configured to, at least, receive an input analog voltage signal;

a baseline reference circuit, the baseline reference circuit configured to, at least, generate a baseline voltage, the baseline reference circuit configurable by the controller; and a difference circuit, the difference circuit configured to, at least, subtract the baseline voltage from the input analog voltage signal.

3. The system of claim 2, wherein the voltage level to be supplied by the power supply unit to the loading circuit is greater than the voltage to be applied across the load by a minimum threshold amount.

4. The system of claim 2, comprising a voltage sensor configured to, at least, measure a voltage drop across the load, a current sensor configured to, at least, measure current passing through the load or both the voltage sensor and the current sensor, the voltage control signal and the current control signal at least partially based on the measured voltage, measured current or both.

5. The system of claim 2, wherein the power electronics comprise a plurality of amplifiers, the plurality of amplifiers comprising at least a first amplifier and a second amplifier, the second amplifier having a greater maximum output current than the first amplifier.

6. The system of claim 2, wherein the voltage control signal and the current control signal are determined at least in part based on open loop control of a performance parameter of the load.

7. The system of claim 2, further comprising a trained machine learning model, the machine learning model trained to, at least, optimize the voltage control signal, the current control signal or both based in part on power dissipation characteristics of the load.

8. The system of claim 2, wherein the controller is configurable to, at least, control the loading circuit to provide constant power, constant current, constant voltage or a combination thereof.

9. The system of claim 2, wherein to configure the baseline reference circuit the controller is configured to at least:

divide the input analog voltage by a step size of the first analog-to-digital converter;

round the result of the division down to a nearest integer value; and multiply the nearest integer value by the step size of the first analog-to-digital converter.

10. The system of claim 2, wherein the baseline reference circuit comprises a programmable voltage source.

11. The system of claim 2, wherein the baseline reference circuit is configured to, at least, receive as input a bias voltage signal, the bias voltage signal combinable with the baseline voltage to mitigate an offset voltage or bias voltage introduced by at least one component of the baseline reference circuit.

12. The system of claim 2, wherein the baseline reference circuit, the controller or both are configured to, at least, compensate for voltage drifts of at least one component of the baseline reference circuit.

13. The system of claim 2, wherein the baseline reference circuit comprises at least one filter configured to, at least, at least partially suppress noise, other artifacts or both from the baseline voltage.

14. The system of claim 2, wherein the difference circuit is configured to, at least, amplify a difference between the input analog voltage signal and the baseline voltage.

15. The system of claim 2, comprising a second analog-to-digital converter configured to, at least, receive an analog output from the difference circuit and convert the analog output into corresponding digital values and wherein the controller is configured to, at least, receive the digital values from the second analog-to-digital converter.

16. The system of claim 15, wherein the controller is configured to at least:

divide the received digital values from the second analog-to-digital converter by a gain of the difference circuit to determine a value of a least significant bit; and replace the values of a least significant bit of the input analog voltage signal with the determined value of the least significant bit.

17. The system of claim 15, wherein the system is configured to, at least, operate the first and second analog-to-digital converters concurrently.

18. The system of claim 2, wherein the first analog-to-digital converter is configured to, at least, receive an analog output from the difference circuit and convert the analog output into corresponding digital values and wherein the controller is configured to, at least, receive the digital values from the first analog-to-digital converter.

19. The system of claim 18, comprising a multiplexer controllable to, at least, select whether the first analog-to-digital converter receives as input the input analog voltage signal or the analog output from the difference circuit.

* * * * *